United States Patent
Satou

(10) Patent No.: US 8,145,406 B2
(45) Date of Patent: Mar. 27, 2012

(54) ABNORMALITY DIAGNOSIS DEVICE FOR POSITIVE CRANKCASE VENTILATION APPARATUS

(75) Inventor: Fumikazu Satou, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 515 days.

(21) Appl. No.: 12/389,004

(22) Filed: Feb. 19, 2009

(65) Prior Publication Data

US 2009/0211545 A1 Aug. 27, 2009

(30) Foreign Application Priority Data

Feb. 21, 2008 (JP) ................................ 2008-040134

(51) Int. Cl.
*B60T 7/12* (2006.01)
(52) U.S. Cl. ........................................ 701/103; 701/104
(58) Field of Classification Search .................... 701/85, 701/97, 99, 103–104
See application file for complete search history.

(56) References Cited

U.S. PATENT DOCUMENTS

| 5,317,909 | A | | 6/1994 | Yamada et al. | |
|---|---|---|---|---|---|
| 5,921,217 | A | * | 7/1999 | Koike et al. | 123/335 |
| 2001/0008136 | A1 | * | 7/2001 | Kitamura et al. | 123/516 |
| 2001/0010214 | A1 | * | 8/2001 | Maegawa et al. | 123/339.23 |
| 2004/0079304 | A1 | * | 4/2004 | Notaras et al. | 123/73 F |
| 2008/0035103 | A1 | * | 2/2008 | Barris et al. | 123/198 E |
| 2010/0133234 | A1 | * | 6/2010 | Yoshida et al. | 216/67 |

FOREIGN PATENT DOCUMENTS

| DE | 101 40 987 A1 | 3/2003 |
|---|---|---|
| DE | 42 10 850 B4 | 11/2007 |
| JP | 5-163993 | 6/1993 |
| JP | 6-241128 | 8/1994 |
| JP | 8-338222 | 12/1996 |
| JP | 10-184335 | 7/1998 |
| JP | 2005-127213 | 5/2005 |
| JP | 2007-2838 | 1/2007 |

\* cited by examiner

*Primary Examiner* — Hussein A. Elchanti
(74) *Attorney, Agent, or Firm* — Oblon, Spivak, McClelland, Maier & Neustadt, L.L.P.

(57) ABSTRACT

An abnormality diagnosis device for diagnosing abnormality in a positive crankcase ventilation apparatus including a PCV passage, which is for supplying blow-by gas to an intake passage of an engine, and a PCV valve, which is for regulating the flow rate of blow-by gas in the PCV passage. The diagnosis device varies a control amount of the PCV valve to determine the occurrence of an abnormality in the PCV passage and PCV valve and performs abnormality diagnosis in a first determination mode when the amount of fuel components in the blow-by gas is less than a reference amount and in a second determination mode when the amount is greater than the reference amount. A varying amount of the control amount of the PCV valve in the second determination mode is smaller than that of the control amount of the PCV valve in the first determination mode.

15 Claims, 9 Drawing Sheets

ABNORMALITY DIAGNOSIS DEVICE FOR POSITIVE CRANKCASE VENTILATION APPARATUS

BACKGROUND OF THE INVENTION

The present invention relates to an abnormality diagnosis device for a positive crankcase ventilation apparatus, which includes a PCV passage for supplying blow-by gas to an intake passage and a PCV valve for regulating the flow rate of the blow-by gas in the PCV passage.

A positive crankcase ventilation apparatus for an internal combustion engine includes a PCV passage through which blow-by gas is drawn from a crankcase to an intake passage and a PCV valve for regulating the flow rate of the blow-by gas in the PCV passage.

In the positive crankcase ventilation apparatus, the occurrence of an abnormality, such as the deposition of sludge along the PCV passage or jamming of the PCV valve, may cause difficulties for properly ventilating the interior of the crankcase. In order to solve this problem, a diagnosis must be performed to determine the occurrence of such an abnormality.

Japanese Laid-Open Patent Publication No. 5-163993 describes an abnormality diagnosis device that compares an air-fuel ratio feedback correction coefficient taken when forcibly closing the opening of the PCV valve and the air-fuel ratio feedback correction coefficient taken when forcibly opening the opening of the PCV valve by an amount that is the same as that during normal driving. Based on the comparison, the abnormality diagnosis device determines whether or not an abnormality is occurring in the positive crankcase ventilation apparatus.

In the abnormality diagnosis device described in Japanese Laid-Open Patent Publication No. 5-163993, when forcibly opening the PCV valve in a state in which the blow-by gas in the crankcase contains a large amount of fuel components, the large amount of fuel components is supplied to the intake passage through the PCV valve. This may result in excessive enrichment of the air-fuel ratio. Specifically, although the abnormality diagnosis device described in Japanese Laid-Open Patent Publication No. 5-163993 allows for determination of an abnormality in the positive crankcase ventilation apparatus, the PCV valve is controlled during the abnormality diagnosis such that the air-fuel ratio becomes excessively enriched.

SUMMARY OF THE INVENTION

It is an object of the present invention to provide an abnormality diagnosis device which accurately determines the occurrence of an abnormality in a positive crankcase ventilation apparatus while preventing the control of a PCV valve during abnormality diagnosis from excessively enriching the air-fuel ratio.

One aspect of the present invention is an abnormality diagnosis device for diagnosing abnormality in a positive crankcase ventilation apparatus. The positive crankcase ventilation apparatus includes a positive crankcase ventilation passage, which is for supplying blow-by gas to an intake passage of an internal combustion engine, and a positive crankcase ventilation valve, which is for regulating the flow rate of blow-by gas in the positive crankcase ventilation passage. The abnormality diagnosis device includes a determination unit that varies a control amount of the positive crankcase ventilation valve to determine the occurrence of an abnormality in at least either one of the positive crankcase ventilation passage and the positive crankcase ventilation valve. The determination unit performs an abnormality diagnosis in a first determination mode when a re-circulated fuel amount, which is the amount of fuel components in the blow-by gas, is less than a reference amount and in a second determination mode when the re-circulated fuel amount is greater than the reference amount. The determination unit sets a varying amount of the control amount of the positive crankcase ventilation valve in the second determination mode to be smaller than that of the control amount of the positive crankcase ventilation valve in the first determination mode.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A preferred embodiment of an abnormality diagnosis device for a positive crankcase ventilation apparatus according to the present invention will now be discussed with reference to FIGS. 1 to 10.

Figure 1:
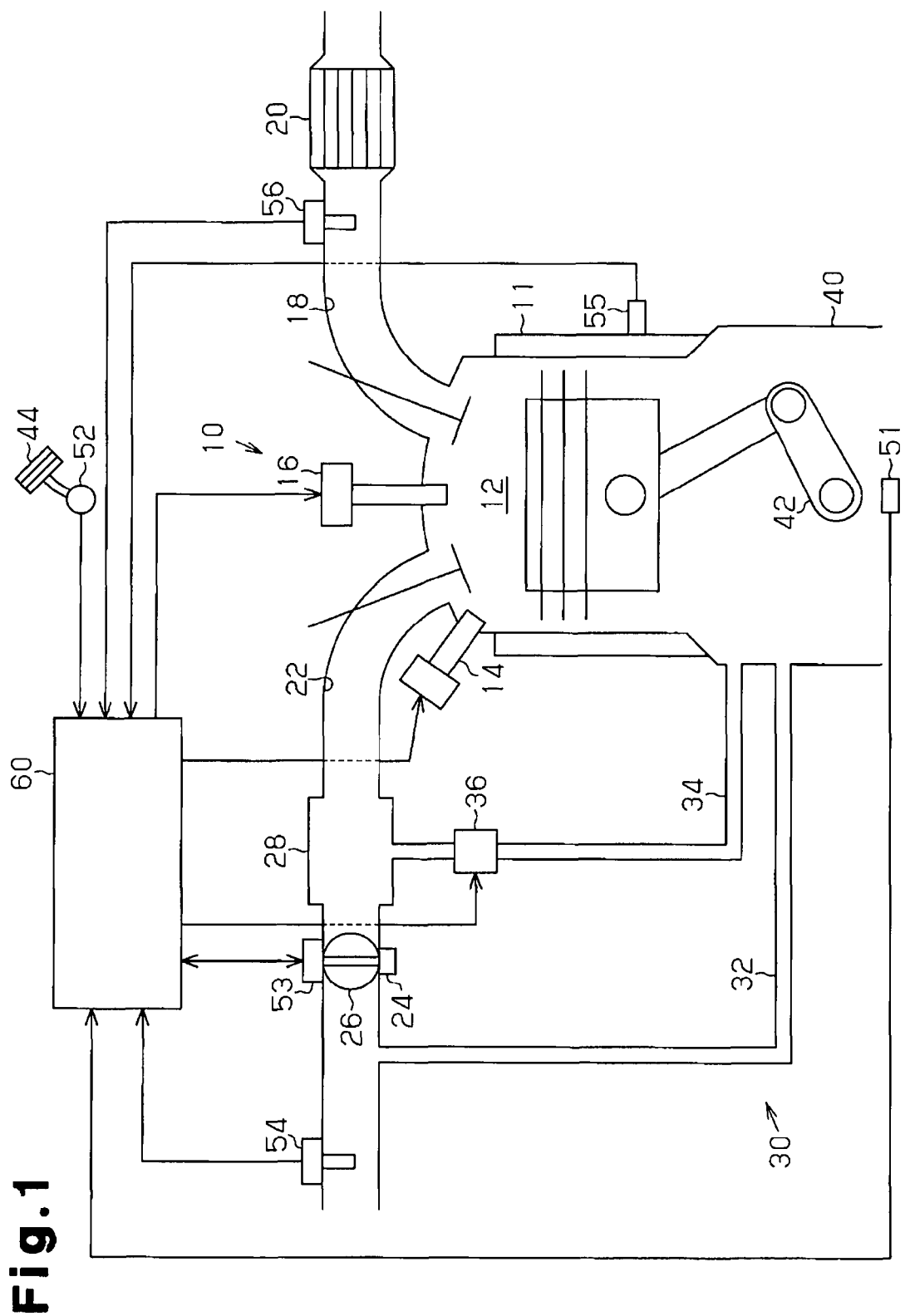
FIG. 1 is a schematic diagram of an in-cylinder injection gasoline engine for a vehicle to which is applied an abnormality diagnosis device for a positive crankcase ventilation apparatus according to a preferred embodiment of the present invention.

FIG. 1 schematically shows the structure of a vehicle in-cylinder injection gasoline engine (hereinafter referred to as an "engine"), which includes a positive crankcase ventilation apparatus.

An engine 10 includes a combustion chamber 12, an injector 14 for directly injecting fuel into the combustion chamber 12, and a spark plug 16 for igniting an air-fuel mixture injected from the injector 14.

A discharge passage 18, which is connected to the combustion chamber 12, includes a catalytic device 20 to eliminate HC, CO, and NOx from the exhaust gas. A throttle valve 26, which is driven by a throttle motor 24 to open and close, is arranged in an intake passage 22 connected to the combustion chamber 12. A surge tank 28 is arranged in the intake passage 22 downstream to the throttle valve 26. The amount of air drawn into the combustion chamber 12 through the intake passage 22 is regulated by the open degree of the throttle valve 26.

The engine 10 includes a positive crankcase ventilation apparatus 30 to re-circulate blow-by gas back to the intake passage 22 from a crankcase 40. The positive crankcase ventilation apparatus 30 includes an breather passage 32 through which air is drawn into the crankcase 40 from a portion of the intake passage 22 upstream to the throttle valve 26, a PCV passage 34 through which blow-by gas is drawn from the crankcase 40 into a portion of the intake passage 22 downstream to the throttle valve 26, and an electronic control PCV valve 36 which regulates the flow rate of blow-by gas in the PCV passage 34.

Further, the engine 10 includes various types of sensors to detect the operating state of the engine 10. Specifically, a rotational speed sensor 51 for detecting the speed of the engine 10 (hereinafter referred to as the "engine speed NE") is arranged in the vicinity of a crankshaft 42. An accelerator depression sensor 52 for detecting the depressed amount of an accelerator pedal 44 (hereinafter referred to as the "accelerator depression amount ACCP") is arranged in the vicinity of the accelerator pedal 44. A throttle sensor 53 for detecting the open degree of the throttle valve 26 (hereinafter referred to as the "throttle open degree TA") is arranged near the throttle valve 26. An air flow meter 54 for detecting the flow rate of air drawn through the intake passage 22 (hereinafter referred to as the "intake air flow rate GA") is arranged upstream to the throttle valve 26. A coolant temperature sensor 55 for detecting the temperature of an engine coolant (hereinafter referred to as the "coolant temperature THW") is arranged in a cylinder block 11. An air-fuel ratio sensor 56 for detecting the oxygen concentration in exhaust gas is arranged upstream to the catalytic device 20. A detection signal from each of the sensors 51 to 56 is input to an electronic control unit 60, which executes various types of controls on the engine 10.

The electronic control unit 60 includes a memory, which stores programs and calculation maps used to execute various types of controls and various types of data used for calculations during the execution of the controls. Based on the operating state of the engine 10 that is recognized from the outputs of various sensors including the sensors 51 to 56, the electronic control unit 60 executes the following controls. For example, the electronic control unit 60 executes throttle control for regulating the amount of intake air in response to a request from a driver, fuel injection control for regulating the amount of fuel injection in accordance with the intake air amount, and idle speed control (hereinafter referred to as the "IS control") for maintaining a constant engine speed when the engine 10 is idling. Further, the electronic control unit 60 executes air-fuel ratio control for maintaining the air-fuel ratio of the air-fuel mixture at a target air-fuel ratio, open degree control on the PCV valve 36 for regulating the amount of blow-by gas supplied from the crankcase 40 to the intake passage 22, a fuel dilution level estimation control for estimating the level of fuel dilution in the lubricating oil in the crankcase 40, and an abnormality diagnosis control for determining the occurrence of an abnormality in the positive crankcase ventilation apparatus 30.

During the throttle control, the electronic control unit 60 sets a command value for the open degree of the throttle valve 26 (hereinafter referred to as the "control amount IFIN of the throttle valve 26") based on the accelerator depression amount ACCP and accordingly operates the throttle motor 24.

During the fuel injection control, the electronic control unit 60 sets a command value for a valve open period of the injector 14 (hereinafter referred to as the "control amount QFIN of the injector 14") in correspondence with the fuel injection amount based on the intake air flow rate GA and accordingly operates the injector 14.

During the open degree control of the PCV valve 36, the electronic control unit 60 sets a command value for the open degree of the PCV valve 36 (hereinafter referred to as the "control amount EPA of the PCV valve 36") based on the engine operating state and accordingly operates an actuator of the PCV valve 36.

During the fuel dilution level estimation control, the electronic control unit 60 calculates the proportion of fuel diluted in the lubricating oil in the crankcase 40, that is, the mass proportion of fuel mixed with the lubricating oil (hereinafter referred to as the "fuel dilution rate DR") based on the engine coolant temperature and transition of the fuel injection amount. The fuel dilution level increases as the engine coolant temperature decreases or as an integration value of the fuel injection amount increases. Taking this factor into consideration, the estimation control carries out calculations in which the fuel dilution rate DR increases as the engine coolant temperature decreases or as the integration value of the fuel injection amount increases.

Figure 2:
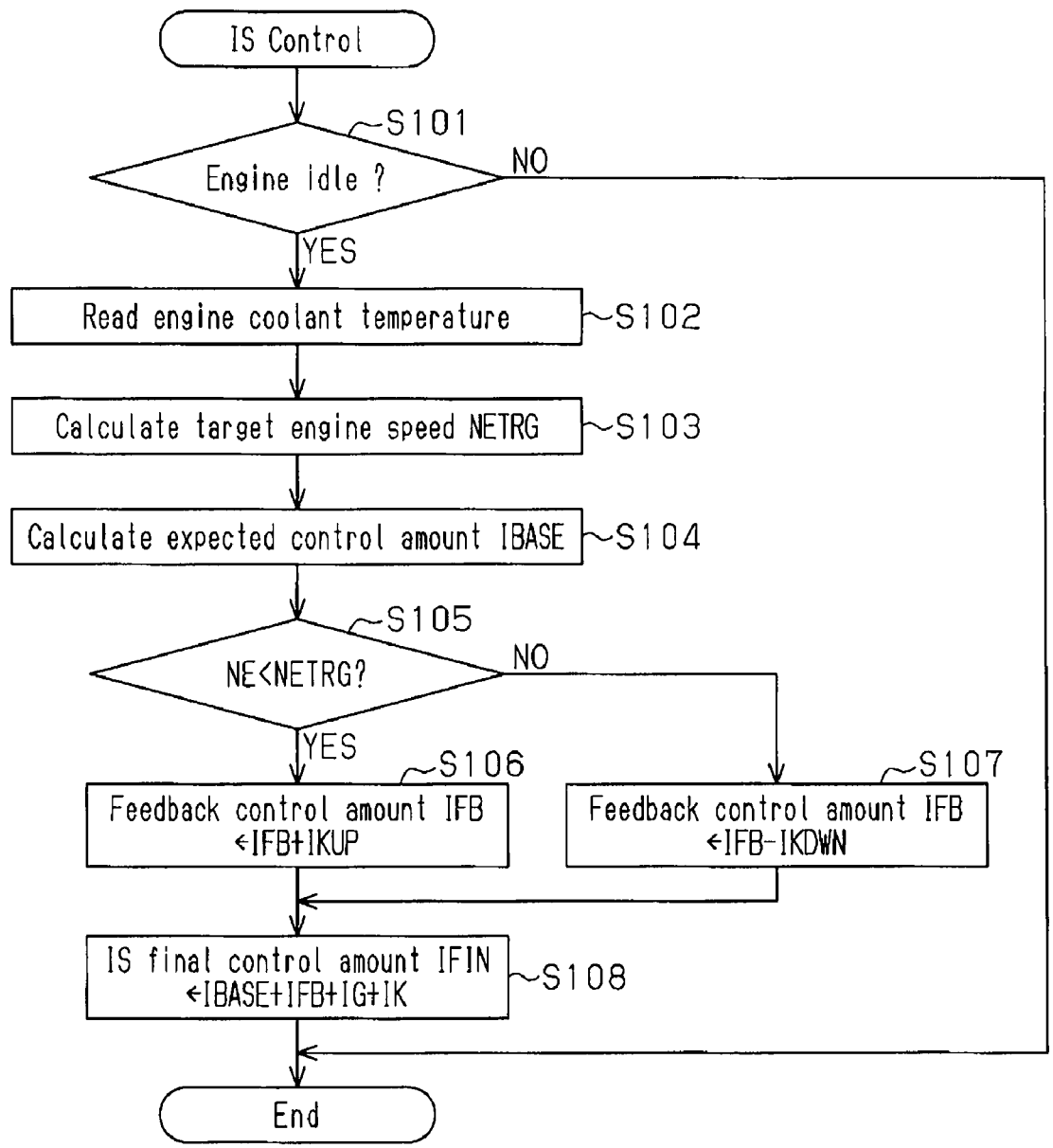
FIG. 2 is a flowchart showing the procedures for executing IS control in the preferred embodiment.
Figure 3:
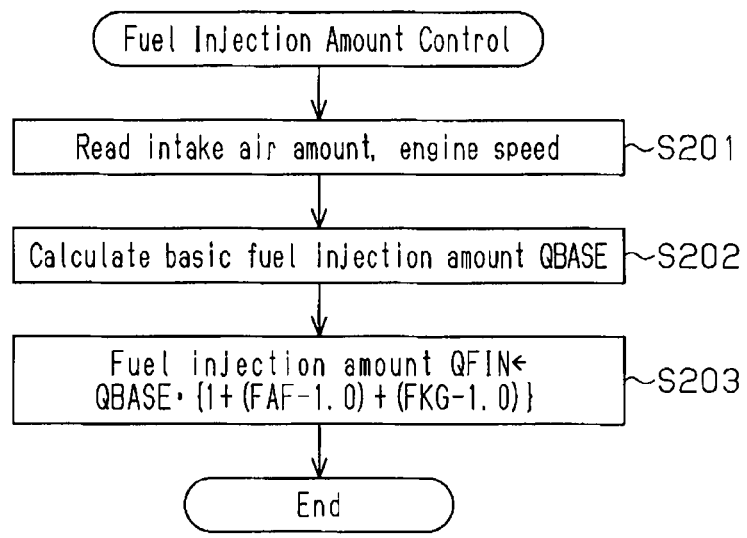
FIG. 3 is a flowchart showing the procedures for executing fuel injection control in the preferred embodiment.

The IS control (FIG. 2), the fuel injection amount control (FIG. 3), and the air-fuel ratio control (FIG. 4) executed by the electronic control unit 60 will now be described in detail with reference to the flowcharts of FIGS. 2 to 4.

<IS Control>

First, the IS control will be described with reference to FIG. 2. FIG. 2 is a flowchart showing the procedures for executing the IS control. The series of processes shown in the flowchart is repeatedly performed in interrupts by the electronic control unit 60 for every predetermined crank angle.

In the series of processes, it is first determined whether or not the engine 10 is idling based on the detection signal from the accelerator depression sensor 52 (step S101). When it is determined that the engine 10 is not idling, the series of processes is temporarily terminated. When it is determined that the engine 10 is idling, the present engine coolant temperature THW is read (step S102). Further, a target value for the engine speed when the engine 10 is idling (hereinafter referred to as the "target engine speed NETRG") is calculated based on the engine coolant temperature THW (step S103). The combustion state of air-fuel mixture is unstable when the temperature of the engine coolant is low. Therefore, in step S103, the target engine speed NETRG is set at a higher value as the temperature of the engine coolant decreases.

In subsequent step S104, an expected control amount IBASE of the throttle valve 26 is calculated based on the target engine speed NETRG. The expected control amount IBASE is the control amount of the open degree of the throttle valve 26, more particularly, the control amount of the throttle motor 24 that opens and closes the throttle valve 26. The expected control amount IBASE is output as a control signal to the throttle motor 24. The expected control amount IBASE is increased as the target engine speed NETRG increases. The actual open degree of the throttle valve 26 increases as the expected control amount IBASE increases. As a result, the amount of the intake air flowing through the throttle valve 26 increases, and the fuel injection amount increases as the intake air amount increases. This increases the actual engine speed. Also, an increase in any one of a feedback control amount IFB, a learning control amount IG, and a final control amount IFIN, which will be discussed later, would also change the engine speed as described above.

In subsequent steps S105 to S107, in order to reduce the difference between the target engine speed NETRG and the engine speed NE (hereinafter referred to as the "engine speed difference ΔNE"), the control amount for feedback controlling the open degree of the throttle valve 26 (hereinafter referred to as the "feedback control amount IFB") is calculated based on the engine speed difference ΔNE.

When calculating the feedback control amount IFB, in step S105, the relation between the target engine speed NETRG and the engine speed NE is determined.

When determined that the engine speed NE is less than the target engine speed NETRG, a predetermined amount IKUP is added to the present feedback control amount IFB. The calculation result (IFB+IKUP) is set as a new feedback control amount IFB.

When determined that the engine speed NE is not less than the target engine speed NETRG, a predetermined amount IKDWN is subtracted from the present feedback control amount IFB. The calculation result (IFB−IKDWN) is set as a new feedback control amount IFB (step S107).

After the updating of the feedback control amount IFB in this manner, a final control amount, that is, the control amount IFIN of the throttle valve 26 is calculated from the following expression (1) (step S108):

$$IFIN \leftarrow IBASE + IFB + IG + IK \quad (1)$$

As shown in expression (1), the control amount IFIN of the throttle valve 26 is calculated by adding the feedback control amount IFB, an auxiliary device load correction amount IK, and a learning control amount IG to the expected control amount IBASE.

The auxiliary device load correction amount IK is obtained by adding correction amounts corresponding to, for example, mechanical loads resulting from the operations of an air conditioner compressor and a hydraulic power unit for a power steering and electrical loads resulting from the operations of a head light and a defogger. As the loads of such auxiliary devices increase, the loads of the auxiliary devices affect and decrease the actual engine speed. Therefore, in step S107, as the loads of the various types of auxiliary devices increase, the control amount IG is increased.

The learning control amount IG is a correction amount for eliminating normal deviation of the engine speed NE from the target engine speed NETRG. When it is determined that the engine speed NE has been deviated from the target engine speed NETRG by a predetermined level or greater for a predetermined period, a value that is the same as the present feedback control amount IFB is set as a new learning control amount IG, and the feedback control amount IFB is set to "0" at the same time as when updating the learning control amount IG. By updating the learning control amount IG in this manner, the learning control amount IG is maintained at a value that is optimal for eliminating normal deviation of the engine speed NE from the target engine speed NETRG.

Through the above processing, the throttle motor 24 is controlled based on the final control amount IFIN obtained from the expression (1) This varies the open degree of the throttle valve 26 so that the engine speed NE approaches the target engine speed NETRG. As a result, the actual engine speed becomes equal to the target engine speed NETRG.

<Fuel Injection Amount Control>

Next, the fuel injection amount control will be described with reference to FIG. 3. FIG. 3 is a flowchart showing the procedures for executing the fuel injection amount control. The series of processes shown in the flowchart is repeatedly performed in interrupts by the electronic control unit 60 at every predetermined crank angle.

In the series of processes, parameters indicating the present engine operating state, such as the intake air flow rate GA and the engine speed NE, are read (step S201). A basic fuel injection amount QBASE is calculated from these parameters (step S202). Then, a final fuel injection amount, that is, the control amount QFIN of the injector 14 is calculated from the following expression (2) (step S203):

$$QFIN \leftarrow QBASE \times \{1 + (FAF - 1.0) + (FKG - 1.0)\} \quad (2)$$

Figure 4:
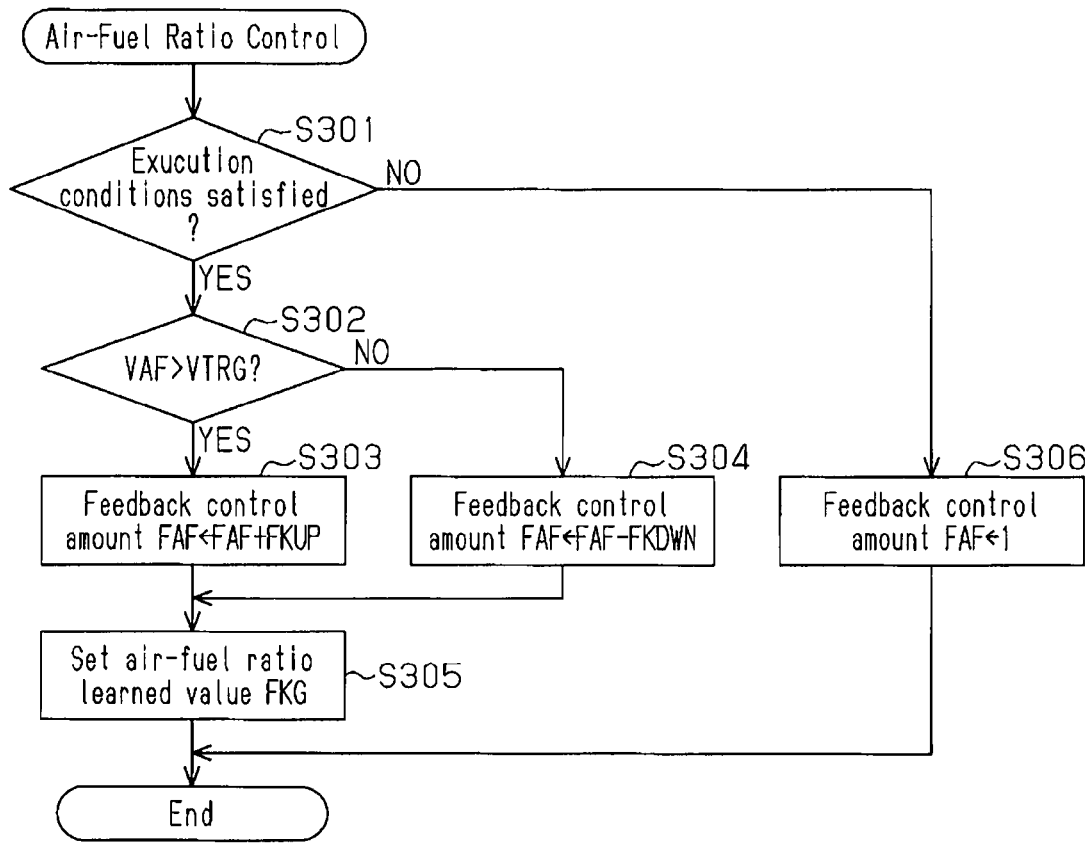
FIG. 4 is a flowchart showing the procedures for executing air-fuel ratio control in the preferred embodiment.

The feedback control amount FAF and the air-fuel ratio learning value FKG are correction amounts of the fuel injection amount calculated during the fuel-ratio control (FIG. 4). The feedback control amount FAF is set as a correction amount that compensates for a temporary deviation of the actual fuel-ratio from the target air-fuel ratio. The air-fuel ratio learning value FKG is set as a correction amount that compensates for the tendency of normal deviation of the actual air-fuel ratio from the target air-fuel ratio. The stoichiometric air-fuel ratio is basically set as the target air-fuel ratio for the engine 10. The target air-fuel ratio may be rich or lean depending on the engine operating state.

After calculating the final fuel injection amount QFIN in this manner, the injector 14 opens only for a period corresponding to the final fuel injection amount QFIN so as to supply the combustion chamber 12 with fuel in accordance with the final fuel injection amount QFIN.

<Air-fuel Ratio Control>

Next, the air-fuel ratio control will be described with reference to FIG. 4. FIG. 4 is a flowchart showing the procedures for executing the air-fuel ratio control. The series of processes shown in the flowchart is repeatedly performed in interrupts by the electronic control unit 60 at every predetermined crank angle.

In the series of processes, first, it is determined whether or not conditions for executing the air-fuel ratio control are satisfied (step S301). The execution conditions of the air-fuel ratio control include the engine being in a state in which it is not being started, fuel cut-off is not being performed, the engine coolant temperature is not less than a predetermined temperature, and the air-fuel ratio sensor 56 is activated.

When at least one of the above conditions is not satisfied, it is determined that the execution conditions of the air-fuel ratio control are not satisfied. In this case, the feedback control amount FAF is set to "1.0" (step S306), and the series of processes is temporarily terminated. Thus, in this case, the feedback control of the fuel injection amount based on the feedback control amount FAF is substantially not performed, and open loop control is executed.

When the above conditions are all satisfied and the execution of the air-fuel ratio control is thereby allowed (step S301: YES), steps S302 to S304 are performed.

In steps S302 to S304, in order to reduce the difference between an output voltage VAF of the air-fuel ratio sensor 56 and a reference voltage VTRG (hereinafter referred to as the "voltage difference ΔV"), the control amount for feedback controlling the air-fuel ratio of the air-fuel mixture based on the voltage difference ΔV is calculated as the feedback control amount FAF.

When calculating the feedback control amount FAF, the relation between the output voltage VAF and the reference voltage VTRG is first determined in step S302.

Figure 5:
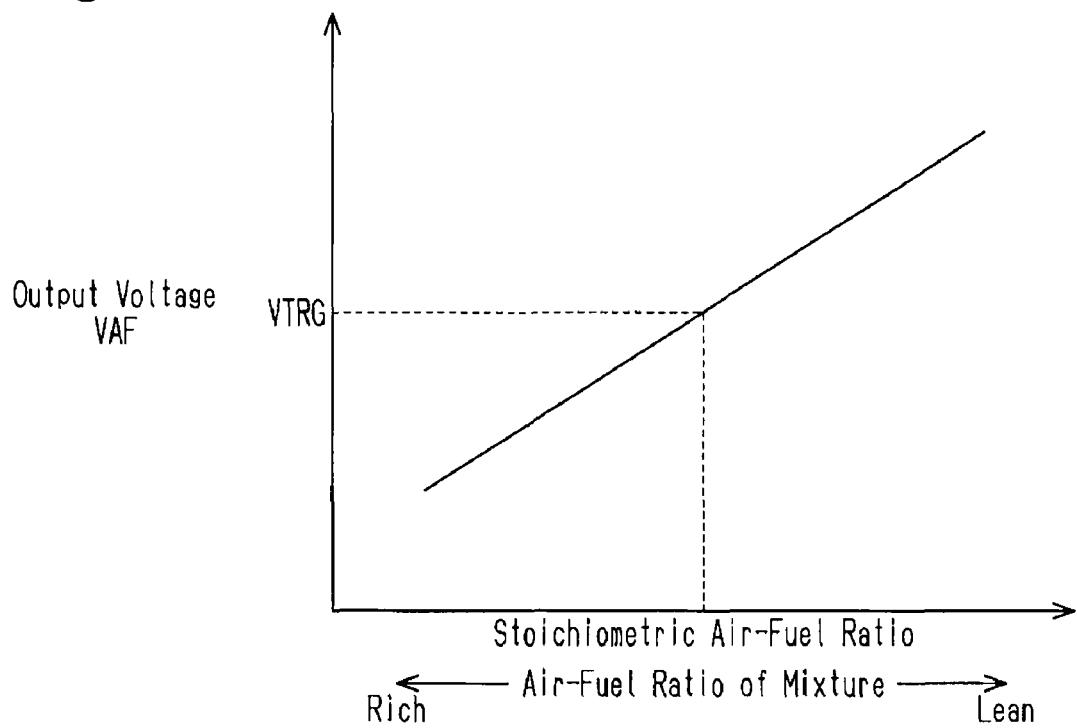
FIG. 5 is a graph showing the relation between an air-fuel ratio of an air-fuel mixture and an output voltage of an air-fuel ratio sensor.

As shown in FIG. 5, the output voltage VAF of the air-fuel ratio sensor 56 increases as the oxygen concentration in the exhaust gas increases, that is, as the deviation amount toward the lean side of the air-fuel ratio of the air-fuel mixture relative to the stoichiometric air-fuel ratio increases. The output voltage VAF of the air-fuel ratio sensor 56 decreases as the oxygen concentration of exhaust gas decreases, that is, as the deviation amount toward the rich side of the air-fuel ratio of air-fuel mixture relative to the stoichiometric air-fuel ratio increases.

In step S302 of FIG. 4, when it is determined that the output voltage VAF is greater than the reference voltage VTRG, that is, when it is determined that the air-fuel ratio of air-fuel mixture is leaner than the stoichiometric air-fuel ratio, a predetermined amount FKUP is added to the present feedback control amount FAF. The calculation result obtained (FAF+FKUP) is set as a new feedback control amount FAF (step S303) and the processing advances to step S305.

When it is determined that the output voltage VAF is less than or equal to the reference voltage VTRG, that is, when it is determined that the air-fuel ratio of air-fuel mixture is richer than the stoichiometric air-fuel ratio, the predetermined amount FKDWN is subtracted from the present feedback control amount FAF. The calculation result (FAF−FKDWN) is set as a new feedback control amount FAF (step S304), and the processing advances to step S305.

In step S305, in order to compensate for the normal deviation tendency of the air-fuel ratio of air-fuel mixture from the target air-fuel ratio, the air-fuel ratio learning value FKG is updated by comparing an average value FAFAVE of the feedback control amount FAF, a predetermined value $\alpha$, and a predetermined value $\beta$ ($\alpha<1.0<\beta$). Specifically, when there is no tendency of a normal deviation of the air-fuel ratio of air-fuel mixture from the target air-fuel ratio, the feedback control amount FAF fluctuates around and near "1.0", which is a reference value. Thus, the average value FAFAVE of the feedback control amount FAF is substantially equal to "1.0". If, for example, the due to individual differences of the injector 14, when the air-fuel ratio of air-fuel mixture tends to normally deviate to the rich side or the lean side from the target air-fuel ratio, the feedback control amount FAF fluctuates around and near a value that is not "1.0". Thus, the average value FAFAVE of the feedback control amount FAF becomes equal to a value that is not the reference value "1.0" in accordance with the deviation tendency. For this reason, it is possible to acquire the deviation tendency of the air-fuel ratio of the air-fuel mixture from the target air-fuel ratio based on the deviation degree of the feedback control amount FAF and the average value FAFAVE of the feedback control amount FAF from the reference value "1.0".

When the average value FAFAVE of the feedback control amount FAF is less than the predetermined value $\alpha$, it is determined that the air-fuel ratio of air-fuel mixture tends to deviate to the rich side from the target air-fuel ratio. In order to compensate for this deviation tendency, the air-fuel ratio learning value FKG is updated to be smaller. When the average value FAFAVE of the feedback control amount FAF is not less than the predetermined value $\beta$, it is determined that the air-fuel ratio of air-fuel mixture tends to deviate to the lean side from the target air-fuel ratio. In order to compensate for this deviation tendency, the air-fuel ratio learning value FKG is updated to be larger.

When the average value FAFAVE of the feedback control amount FAF is within a range of not less than the predetermined value $\alpha$ and less than the predetermined value $\beta$ ($\alpha \leq \text{FAFAVE} < \beta$), the average value FAFAVE fluctuates near the reference value "1.0". Thus, it is determined that there is no tendency for the actual air-fuel ratio in the air-fuel mixture to deviate from the target air-fuel ratio. In such a case, the air-fuel ratio learning value FKG is not updated, and the air-fuel ratio learning value FKG is maintained at the present value. The air-fuel ratio learning value FKG is calculated in the above manner. Then, the series of processes is temporarily terminated.

As described above, in the positive crankcase ventilation apparatus 30, it is difficult to properly ventilate the interior of the crankcase 40 during the occurrence of an abnormality such as the deposition of sludge in the PCV passage 34 or the jamming of the PCV valve 36. Therefore, in order to resolve such a situation, it is first required that a diagnosis be performed to determine the occurrence of an abnormality.

As an abnormality diagnosis for the positive crankcase ventilation apparatus 30, for example, the feedback control amount FAF in the air-fuel ratio control when forcibly closing the opening of the PCV valve 36 is compared with the feedback control amount FAF when forcibly opening the opening of the PCV valve 36 to the open degree for normal operation. Based on the comparison, the occurrence of an abnormality in the positive crankcase ventilation apparatus 30 is determined.

However, when forcibly opening the PCV valve 36 in a state in which a large amount of fuel components (re-circulated fuel amount) is contained in the blow-by gas in the crankcase 40, the large amount of fuel components is supplied to the intake passage 22 through the PCV valve 36. It can be assumed that this would result in excessive enrichment of the air-fuel ratio.

Therefore, in the preferred embodiment, the abnormality diagnosis is performed as described below so that the occurrence of an abnormality in the positive crankcase ventilation apparatus 30 is accurately detected while preventing the control of the PCV valve 36 executed during the abnormality diagnosis from causing excessive enrichment of the air-fuel ratio.

Specifically, when the re-circulated fuel amount is less than a reference amount, the electronic control unit 60, which functions as a determination unit, performs a first abnormality diagnosing process in a first determination mode to forcibly vary the control amount EPA of the PCV valve 36 by a first predetermined amount. When the re-circulated fuel amount is greater than the reference amount, the electronic control unit 60 performs a second abnormality diagnosis in a second determination mode to forcibly vary the control amount EPA of the PCV valve 36 by a second predetermined amount which is less than the first predetermined amount.

Either one of the two abnormality diagnosing processes, which differ from each other in the forcibly varied amount of the control amount, is selected based on the re-circulated fuel amount. This achieves accurate determination of an abnormality in the positive crankcase ventilation apparatus 30 while preventing excessive enrichment of the air-fuel ratio in the manner described below.

In the abnormality diagnosis performed by varying the control amount EPA of the PCV valve 36, the accuracy of the diagnosis result is improved by increasing the varying degree of the control amount EPA. When the re-circulated fuel amount is relatively small, that is, when the re-circulated fuel amount is less than the reference amount (state A), even if the actual open degree of the PCV valve 36 is significantly varied, an excessively large amount of fuel is less likely to flow into the intake passage 22 from the PCV passage 34. However, when the re-circulated fuel amount is large, that is, when the re-circulated fuel amount is greater than the reference amount (state B), even if the varied amount of the open degree PA of the PCV valve 36 is small, the amount of fuel supplied to the intake passage 22 from the PCV passage 34 would be large when varying the open degree PA. In this case, the varying degree of the air-fuel ratio of the air-fuel mixture and the varying degree of the feedback control amount FAF in the air-fuel ratio control would be large enough to accurately determine whether or not an abnormality is occurring in the positive crankcase ventilation apparatus 30.

Accordingly, if the re-circulated fuel is in state B when starting the abnormality diagnosis, an abnormality in the positive crankcase ventilation apparatus 30 would be accurately determined just by slightly varying the control amount EPA of the PCV valve 36. As a result, the occurrence of an abnormality is accurately determined while preventing excessive enrichment of the air-fuel ratio. If the re-circulated fuel is in state A when starting the abnormality diagnosis, an excessively large amount of re-circulated fuel would not be supplied to the intake passage 22 even when significantly varying the control amount EPA of the PCV valve 36. Thus, the air-fuel ratio would not become excessively rich. Further, by significantly varying the control amount EPA, the occurrence of an abnormality in the positive crankcase ventilation apparatus 30 would be accurately determined.

Hereinafter, the first abnormality diagnosing process and the second abnormality diagnosing process will each be discussed.

<First Abnormality Diagnosing Process>

In the engine 10, an in-cylinder air amount GSUM, which is the amount of air drawn into a cylinder, is the sum of an air amount GT passing through the throttle valve 26 and the air amount (the blow-by gas amount) GP passing through the PCV valve 36, as represented by the following expression (3):

$$GSUM=GT+GP \quad (3)$$

Here, it is assumed that the engine 10 is idling and the in-cylinder air amount GSUM is maintained at a substantially constant amount in a state in which there is no abnormality in the positive crankcase ventilation apparatus 30. Under such a situation, the operation mode of the feedback control amount IFB in the IS control when varying the open degree of the PCV valve 36 will be described.

First, when varying the actual open degree of the PCV valve 36 from a first open degree PA1 to a second open degree PA2, which is greater than the first open degree PA1, the feedback control amount IFB is manipulated as follows. The blow-by gas amount GP passing through the PCV valve 36 increases as the open degree of the PCV valve 36 increases. Thus, in order to compensate for the increase of the in-cylinder air amount GSUM resulting from the increase in the blow-by gas amount GP, the feedback control amount IFB is decreased from the feedback control amount IFB taken before the increasing of the open degree of the PCV valve 36 in correspondence with the increase in the blow-by gas amount GP.

Next, when the actual open degree of the PCV valve 36 is varied from the first open degree PA1 to a third open degree PA3, which is less than the first open degree PA1, the feedback control amount IFB is manipulated as follows. The blow-by gas amount GP passing through the PCV valve 36 decreases as the open degree of the PCV valve 36 decreases. Thus, in order to compensate for the decrease of the in-cylinder air amount GSUM resulting from the decrease of the blow-by gas amount GP, the feedback control amount IFB is increased from the feedback control amount IFB taken before the decreasing of the open degree of the PCV valve 36 in correspondence with the decrease in the blow-by gas amount GP.

Thus, when there is no abnormality in the positive crankcase ventilation apparatus 30, a difference corresponding to the difference between the blow-by gas amount GP1 for the first open degree PA1 and the blow-by gas amount GP2 for the second open degree PA2 is produced between the feedback control amount IFB1 for when the PCV valve 36 is maintained at the first open degree PA1 and the feedback control amount IFB2 for when the PCV valve 36 is maintained at the second open degree PA2. Further, a difference corresponding to the difference between the blow-by gas amount GP1 for the first open degree PA1 and the blow-by gas amount GP3 for the third open degree PA3 is produced between the feedback control amount IFB1 for when the PCV valve 36 is maintained at the first open degree PA1 and the feedback control amount IFB3 for when the PCV valve 36 is maintained at the third open degree PA3.

When there is an abnormality in the positive crankcase ventilation apparatus 30, the difference corresponding to the difference between the blow-by gas amount GP1 for the first open degree PA1 and the blow-by gas amount GP2 for the second open degree PA2 or the blow-by gas amount GP3 for the third open degree PA3 is not produced between the feedback control amount IFB1 and the feedback control amount IFB2 or the feedback control amount IFB3.

Thus, in the first abnormality diagnosing process of the preferred embodiment, based on the relation between the feedback control amount and the blow-by gas amount, the control amount EPA of the PCV valve 36 is forcibly varied from a control amount EPAA1 (control amount A1) to a control amount EPAA2 (control amount A2). Further, a feedback control amount IFBA1 (predetermined parameter A) for when the control amount EPA of the PCV valve 36 is the control amount EPAA1 and a feedback control amount IFBA2 (predetermined parameter A) for when the control amount EPA of the PCV valve 36 is the control amount EPAA2 are compared with each other. When the absolute value of the difference (reference difference AY) between the feedback control amount IFBA1 and the feedback control amount IFBA2 is less than or equal to a reference value $\Delta IFBAX$ (reference value AX), it is determined that an abnormality is occurring in the positive crankcase ventilation apparatus 30.

<Second Abnormality Diagnosing Process>

In a single combustion cycle of the engine 10, a total fuel amount QSUM, which is the total amount of the fuel supplied to the combustion chamber 12, is obtained by adding a fuel injection amount QI, which is the amount of fuel injected from the injector 14, and a re-circulated fuel amount QP, which is the amount of fuel supplied to the intake passage 22 from the PCV passage 34, as shown in the following expression (4).

$$QSUM=QI+QP \quad (4)$$

It is assumed here that the engine 10 is idling in which the in-cylinder air amount GSUM is maintained at a substantially constant amount, while the air-fuel ratio control is being executed so as to correct the fuel injection amount in order to maintain the air-fuel ratio of the air-fuel mixture at the target air-fuel ratio under a situation in which there is no abnormality in the positive crankcase ventilation apparatus 30. The manipulation of the feedback control amount FAF during the air-fuel ratio control when varying the open degree of the PCV valve 36 under such a condition will now be discussed.

First, when the actual open degree of the PCV valve 36 is varied from the first open degree PA1 to the second open degree PA2, which is greater than the first open degree PA1, the feedback control amount FAF is manipulated as follows. Specifically, the re-circulated fuel amount QP supplied to the intake passage 22 from the PCV passage 34 increases as the open degree of the PCV valve 36 increases. Therefore, in order to compensate for the increase in the total fuel amount QSUM resulting from the increase in the re-circulated fuel amount QP, the feedback control amount FAF (fuel injection amount QI) is decreased from the feedback control amount FAF taken before the increasing of the open degree of the PCV valve 36 in correspondence with the increase in the re-circulated fuel amount QP.

Next, when the actual open degree of the PCV valve 36 is varied from the first open degree PA1 to the third open degree PA3, which is less than the first open degree PA1, the feedback control amount FAF is manipulated as follows. Specifically, the re-circulated fuel amount QP supplied to the intake passage 22 through the PCV passage 34 decreases as the open degree of the PCV valve 36 decreases. Therefore, in order to compensate for the decrease in the total fuel amount QSUM resulting from the decrease in the re-circulated fuel amount QP, the feedback control amount FAF (fuel injection amount QI) is increased from the feedback control amount FAF taken before the decreasing of the open degree of the PCV valve 36 in correspondence with the decrease in the re-circulated fuel amount QP.

Thus, when there is no abnormality in the positive crankcase ventilation apparatus 30, a difference corresponding to the difference between the re-circulated fuel amount QP1 for the first open degree PA1 and the re-circulated fuel amount QP2 for the second open degree PA2 is produced between the feedback control amount FAF1 for when the PCV valve 36 is maintained at the first open degree PA1 and the feedback control amount FAF2 for when the PCV valve 36 is maintained at the second open degree PA2. Further, a difference corresponding to the difference between the re-circulated fuel amount QP1 for the first open degree PA1 and the re-circulated fuel amount QP3 for the third open degree PA3 is produced between the feedback control amount FAF1 for when the PCV valve 36 is maintained at the first open degree PA1 and the feedback control amount FAF3 for when the PCV valve 36 is maintained at the third open degree PA3.

When an abnormality occurs in the positive crankcase ventilation apparatus 30, a difference corresponding to the difference between the re-circulated fuel amount QP1 for the first open degree PA1 and the re-circulated fuel amount QP2 for the second open degree PA2 or the re-circulated fuel amount QP3 for the third open degree PA3 is not produced between the feedback control amount FAF1 and the feedback control amount FAF2 or the feedback control amount FAF3.

Thus, in the second abnormality diagnosing process of the preferred embodiment, the control amount EPA of the PCV valve 36 is forcibly varied from a control amount EPAB1 (control amount B1) to a control amount EPAB2 (control amount B2) based on the relation between the feedback control amount and the blow-by gas amount. A feedback control amount FAFB1 (a predetermined parameter B) for when the control amount EPA of the PCV valve 36 is the control amount EPAB1 and a feedback control amount FAFB2 (a predetermined parameter B) for when the control amount EPA of the PCV valve 36 is the control amount EPAB2 are compared with each other. When the absolute value of the difference (reference difference BY) between the feedback control amount FAFB1 and the feedback control amount FAFB2 is less than or equal to a reference value $\Delta$IFAFBX (a reference value BX), it is determined that an abnormality occurs in the positive crankcase ventilation apparatus 30.

Figure 6:
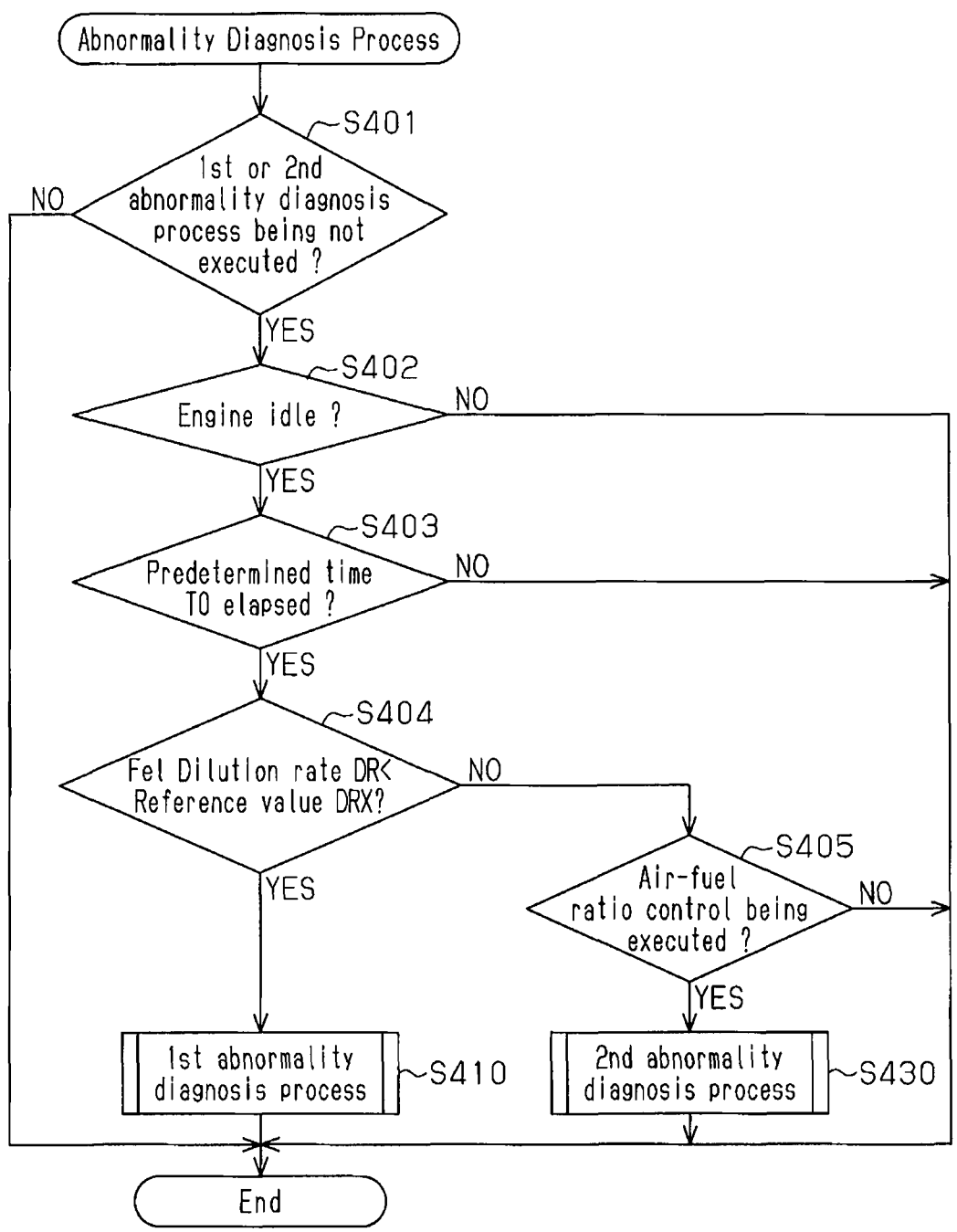
FIG. 6 is a flowchart showing the procedures for executing abnormality diagnosis in the preferred embodiment.

The specific procedures for performing the abnormality diagnosis of the preferred embodiment will now be discussed with reference to the flowchart of FIG. 6. The series of processes shown in the flowchart is repeatedly performed in interrupts by the electronic control unit 60 at predetermined crank angles.

In the series of processes, it is determined whether or not either one of the first abnormality diagnosing process of step S410 and the second abnormality diagnosing process of step S430 is being performed (step S401). When it is determined that either one of these abnormality diagnosing processes is being performed, the series of processes is temporarily terminated.

When it is determined that the first and second abnormality diagnosing processes are both not being performed, it is determined whether or not the engine 10 is idling (step S402). By determining that the engine 10 is idling (i.e., state in which the IS control is being executed), it may be determined whether or not a state in which the in-cylinder air amount GSUM is maintained at a substantially constant amount is being continued. A state in which the in-cylinder air amount GSUM is maintained at a substantially constant amount indicates a state in which the fluctuation range of the in-cylinder air amount GSUM is sufficiently smaller than that during normal driving of the engine 10.

When it is determined that the engine 10 is not idling, the series of processes is temporarily terminated. When it is determined that the engine 10 is idling, after performing the determination of step S402, it is determined whether or not a predetermined time T0 has elapsed (step S403). Since the engine speed is not sufficiently stable immediately after the engine 10 starts to idle, a predetermined time is required for the fluctuation width of the in-cylinder air amount GSUM to become sufficiently small. Thus, in the abnormality diagnosing process, the determination process of step S403 is performed by waiting for the predetermined time to elapse before reading the feedback control amount IFB or feedback control amount FAF that is suitable for the first abnormality diagnosing process of step S410 or the second abnormality diagnosing process of step S430. Specifically, the predetermined time T0 is set to be no less than a value which corresponds to the time from when the engine 10 starts to idle to when the fluctuation width of the in-cylinder air amount GSUM becomes sufficiently small.

When it is determined that the predetermined time T0 has not elapsed in the determination process of step S403, the series of processes is temporarily terminated. When it is determined that the predetermined time T0 has elapsed in the determination process of step S403, it is determined whether or not the present fuel dilution rate DR is less than a reference value DRX (step S404).

The re-circulated fuel amount QP and the fuel dilution rate DR have a correlation. Basically, the re-circulated fuel amount QP increases as the fuel dilution rate DR increases. Thus, even if the re-circulated fuel amount QP cannot be directly detected or estimated, it can be determined from the fuel dilution rate DR whether or not the present re-circulated fuel amount QP is greater than a reference amount, that is, it can be determined whether the re-circulated fuel is in state A or state B. Accordingly, in the process of step S404, the relation between the re-circulated fuel amount and the reference amount is recognized from the comparison between the fuel dilution rate DR and the reference value DRX.

If determined that the fuel dilution rate DR is less than the reference value DRX, the first abnormality diagnosing process is started (step S410). Then, the present abnormality diagnosing process is terminated.

If determined that the fuel dilution rate DR is greater than or equal to the reference value DRX, then it is determined whether or not the air-fuel ratio control is being executed (step S405). When determined that the air-fuel ratio control is not being executed, the series of processes is temporarily terminated.

In the determination process of step S405, when it is determined that the air-fuel ratio control is being executed, the second abnormality diagnosing process is started (step S430). Then, the present abnormality diagnosing process is temporarily terminated. In this manner, to execute the first abnormality diagnosing process, the engine 10 is required to be idling. Further, to execute the second abnormality diagnosing process, the engine 10 is required to be idling while the air-fuel ratio control is being executed.

Figure 7:
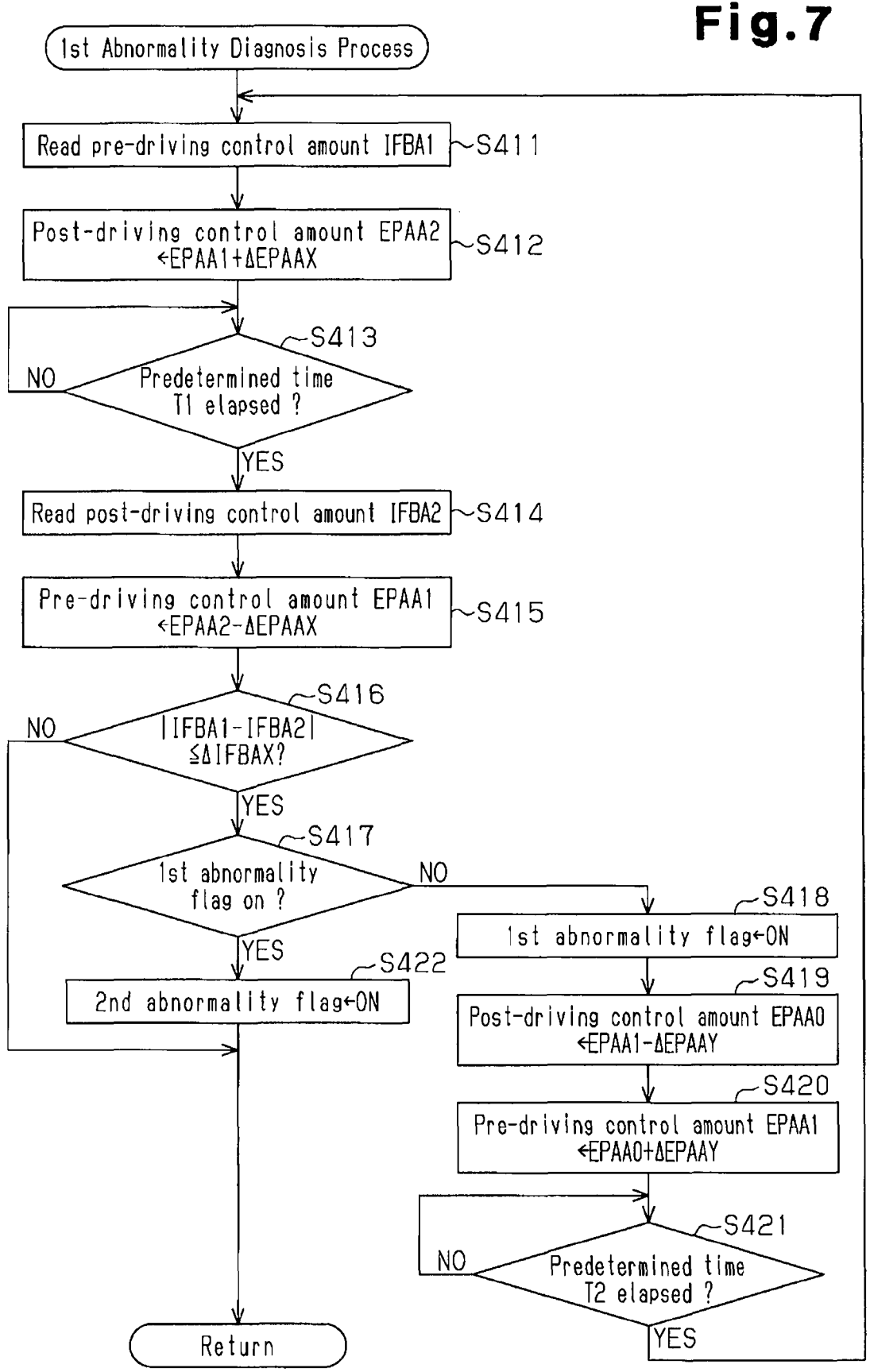
FIG. 7 is a flowchart showing the procedures for executing first abnormality diagnosis in the preferred embodiment.

The specific procedures for performing the first abnormality diagnosing process will now be discussed with reference to the flowchart of FIG. 7. The series of processes shown in the flowchart is executed when the processing advances to step S410 in the flowchart of FIG. 6.

In the series of processes, the present feedback control amount IFB in the IS control, that is, the feedback control amount IFB (hereinafter referred to as the "pre-driving control amount IFBA1"), which is taken immediately before the control amount EPA of the PCV valve 36 is forcibly varied by the process in next step S412, is first read (step S411).

Next, the control amount EPA of the PCV valve 36 is forcibly increased by a predetermined amount ΔEPAAX (predetermined amount Ca) from the present control amount (hereinafter referred to as the "pre-driving control amount EPAAL"). Specifically, the control amount EPA of the PCV valve 36 is increased from the control amount EPAA1 to a control amount (hereinafter referred to as a "post-driving control amount EPAA2") in which the predetermined amount ΔEPAAX is added to the control amount EPAA1 (step S412). The forcible increase of the control amount EPA indicates that the control amount EPA is varied only for the purpose of the abnormality diagnosis. Further, the forcible increase of the control amount EPA indicates that the control amount EPA is varied regardless of the conditions for setting the control amount EAP during normal control for the regulation of the blow-by gas amount.

When the positive crankcase ventilation apparatus 30 is in a normal state, the open degree of the PCV valve 36 is changed from a pre-driving open degree PAA1 corresponding to the pre-driving control amount EPAA1 to an post-driving open degree PAA2 corresponding to the post-driving control amount EPAA2 (PAA2>PAA1) when the control amount EPA is varied from the control amount EPAA1 to the control amount EPAA2. As a result, the blow-by gas amount GP passing through the PCV valve 36 is increased in correspondence with the difference between the open degree PAA1 and the open degree PAA2. This increases the fuel injection amount, which in turn increases the actual engine speed.

When an abnormality such as jamming occurs in the PCV valve 36, the actual open degree of the PCV valve 36 does not vary from the pre-driving open degree PAA1 to the post-driving open degree PAA2 even if the control amount EPA of the PCV valve 36 is varied as described above. Therefore, the blow-by gas amount GP supplied to the intake passage 22 is not increased in correspondence with the difference between the pre-driving open degree PAA1 and the post-driving open degree PAA2.

When an abnormality such as clogging occurs in the PCV passage 34 although the PCV valve 36 is functioning normally, the actual open degree of the PCV valve 36 is varied from the pre-driving open degree PAA1 to the post-driving open degree PAA2 when the control amount EPA of the PCV valve 36 is varied as described above. However, the blow-by gas amount GP supplied to the intake passage 22 does not vary in correspondence with the difference between the pre-driving open degree PAA1 and the post-driving open degree PAA2.

Next, it is determined whether or not the predetermined time T1 has elapsed from when the control amount EPA was forcibly varied in step S412 (step S413). Under a condition in which the PCV valve 36 is functioning normally, when the control amount EPA is varied, there is a predetermined time delay before the actual open degree of the PCV valve 36 comes into correspondence with the control amount EPA. Thus, in the present abnormality diagnosing process, the determination process of step S413 is performed to take into consideration the response delay so that the appropriate feedback control amount IFB can be read in subsequent step S414. Specifically, the predetermined time T1 is set to be no less than a value which corresponds to the time from when the control amount EPA is varied to when the changed control amount EPA is reflected in the actual open degree.

When it is determined that predetermined time T1 has not elapsed in the determination process of step S413, the determination processing is repeatedly executed in fixed intervals until it is determined that the predetermined time T1 has elapsed. When it is determined that the predetermined time T1 has elapsed in the determination process of step S413, the feedback control amount IFB for the IS control after forcibly varying the control amount EPA of the PCV valve 36 (hereinafter referred to as the "post-driving control amount IFBA2") is read (step S414).

Next, the control amount EPA of the PCV valve 36 is varied from the present control amount to the control amount prior to the forcible varying performed in step S412. Specifically, the control amount EPA is varied from the post-driving control amount EPAA2 to the pre-driving control amount EPAA1 (step S415).

Next, it is determined whether or not the absolute value of the difference between the pre-driving control amount IFBA1 obtained in the process of step S411 and the post-driving control amount IFBA2 obtained in the process of step S414 is less than or equal to the reference value ΔIFBAX. That is, it is determined whether or not these feedback control amounts IFB have a difference corresponding to the difference between the blow-by gas amount GPA1 for the pre-driving open degree PAA1 of the PCV valve 36 and the blow-by gas amount GPA2 for the post-driving open degree PAA2 (step S416). The reference value ΔIFBAX is set as a value between "0" and a reference control amount difference, which is the absolute value between the pre-driving control amount IFBA1 and the post-driving control amount IFBA2 under the condition that there is no abnormality in the positive crankcase ventilation apparatus 30.

When the above absolute value of the difference is greater than the reference value ΔIFBAX, it is determined that there is no abnormality in the PCV valve 36 and PCV passage 34 of the positive crankcase ventilation apparatus 30. Thus, the processing is temporarily terminated.

When the absolute value of the difference is less than or equal to the reference value ΔIFBAX, it is determined whether or not a first abnormality flag is "ON" (step S417). When the first abnormality flag is still not "ON", the processes of subsequent steps S418 to S420 are sequentially performed.

First, the first abnormality flag is turned "ON" in the process of step S418. Next, the control amount EPA of the PCV valve 36 is forcibly decreased by a predetermined amount ΔEPAAY from the present control amount (pre-driving control amount EPAA1). Specifically, the control amount EPA of the PCV valve 36 is decreased to a control amount (hereinafter referred to as a "post-driving control amount EPAA0) obtained by subtracting the predetermined amount ΔEPAAY from the control amount EPAA1 (step S419). Subsequently, the control amount EPA of the PCV valve 36 is varied from the present control amount to the control amount prior to the forcible varying performed in step S419. Specifically, the control amount EPA is varied from the control amount EPAA0 to the control amount EPAA1 (step S420).

The purpose for further forcibly varying the control amount EPA of the PCV valve 36 after determining the occurrence of an abnormality in the positive crankcase ventilation apparatus 30 in the determination process of step S417 will now be discussed.

When an abnormality occurs in the PCV valve 36 due to jamming of the PCV valve 36 caused by foreign matter caught in a valve driving portion or the solidification of moisture, the foreign matter or moisture may be eliminated by the force of a motor that drives the PCV valve 36. Thus, in the abnormality diagnosing process, when the PCV valve 36 is jammed due to foreign matter, the control amount EPA of the PCV valve 36 is forcibly varied to generate force for eliminating the foreign matter. Further, the predetermined amount ΔEPAAY is set to a value greater than the predetermined amount ΔEPAAX in steps S412 and S415 to further ensure that the problem of valve jamming is resolved (ΔEPAAY>ΔEPAAX).

When the jamming of the PCV valve 36 is eliminated by forcibly varying the control amount EPA of the PCV valve 36, the open degree of the PCV valve 36 is varied from the pre-driving open degree PAA1 to a fully closed open degree PAA0 corresponding to a fully closed state in relation with the control. In the abnormality diagnosing process, the valve jamming is eliminated by decreasing the control amount EPA. Thus, the actual open degree of the PCV valve 36 is varied to the closed side when the jamming is eliminated. As a result, the blow-by gas amount GP supplied to the intake passage 22 becomes less than that prior to the forcible varying of the control amount EPA. Accordingly, the fuel components supplied to the intake passage 22 together with the blow-by gas is prevented from increasing when the valve jamming is resolved. Therefore, valve jamming is resolved and fluctuation of the air-fuel ratio is prevented at the same time.

After forcibly varying the control amount EPA of the PCV valve 36 through the processes of steps S418 to S420, it is determined whether or not a predetermined time T2 has elapsed from when the control amount EPA was varied in step S420 (step S421). The purpose for performing the determination process of step S421 will now be discussed.

In the abnormality diagnosing process, valve jamming is resolved by forcibly varying the control amount EPA in steps S419 and S420. After the forcible varying, the abnormality determination of steps S411 to S416 is performed again in order to determine whether or not the valve jamming has actually been resolved. If the valve jamming is resolved through the processing of steps S419 and S420, this would fluctuate the blow-by gas amount supplied to the intake passage 22. Accordingly, if the processes subsequent to step S411 are performed immediately after the processes of steps S419 and S420, the abnormality determination of steps S411 to S416 may be performed in a state in which the blow-by gas amount fluctuates greatly due to the elimination of the valve jamming. In such a case, the result of the abnormality diagnosis is most likely inaccurate. Thus, in the abnormality diagnosing process, in order to prevent the accuracy of the second abnormality diagnosis from becoming low due to excessive fluctuation of the blow-by gas amount caused by the elimination of the valve jamming and the forcible varying of the control amount EPA after the elimination of the valve jamming, the processes subsequent to step S411 are performed again after step S421, which is for ensuring that the blow-by gas amount does not excessively fluctuate. Specifically, when the varying of the control amount EPA in steps S419 and S420 is reflected on the actual open degree, the predetermined time T2 is set to be no less than a value corresponding to the time required for the varied blow-by gas amount to stabilize. Further, the predetermined time T2 is set to be greater than the predetermined time T1 of step S413.

When it is determined that the absolute value of the difference of the feedback control amount IFB is greater than the reference value ΔIFBAX in the determination process of step S416 that is performed again, the positive crankcase ventilation apparatus 30 is determined as being normal. Thus, the series of processes is temporarily terminated. In this case, the first determination result obtained in the first determination process of step S416 in a state in which the first abnormality flag is "OFF" and the second abnormality flag is "OFF" indicates the occurrence of an abnormality. However, it can be determined that the determination result, which is obtained from the first determination process of step S416 and which indicates the occurrence of an abnormality, is due to the jamming of the PCV valve 36. It can further be determined that this jamming has been eliminated by forcibly varying the control amount EPA of the PCV valve 36. Specifically, if the occurrence of an abnormality is determined by the determination process of step S416 when the first abnormality flag is "ON" and the second abnormality flag is "OFF", jamming of the PCV valve 36 and elimination of the jamming can both be recognized. Such a determination result may be stored in a memory of the electronic control unit 60 for maintenance purposes of the engine 10.

Figure 8:
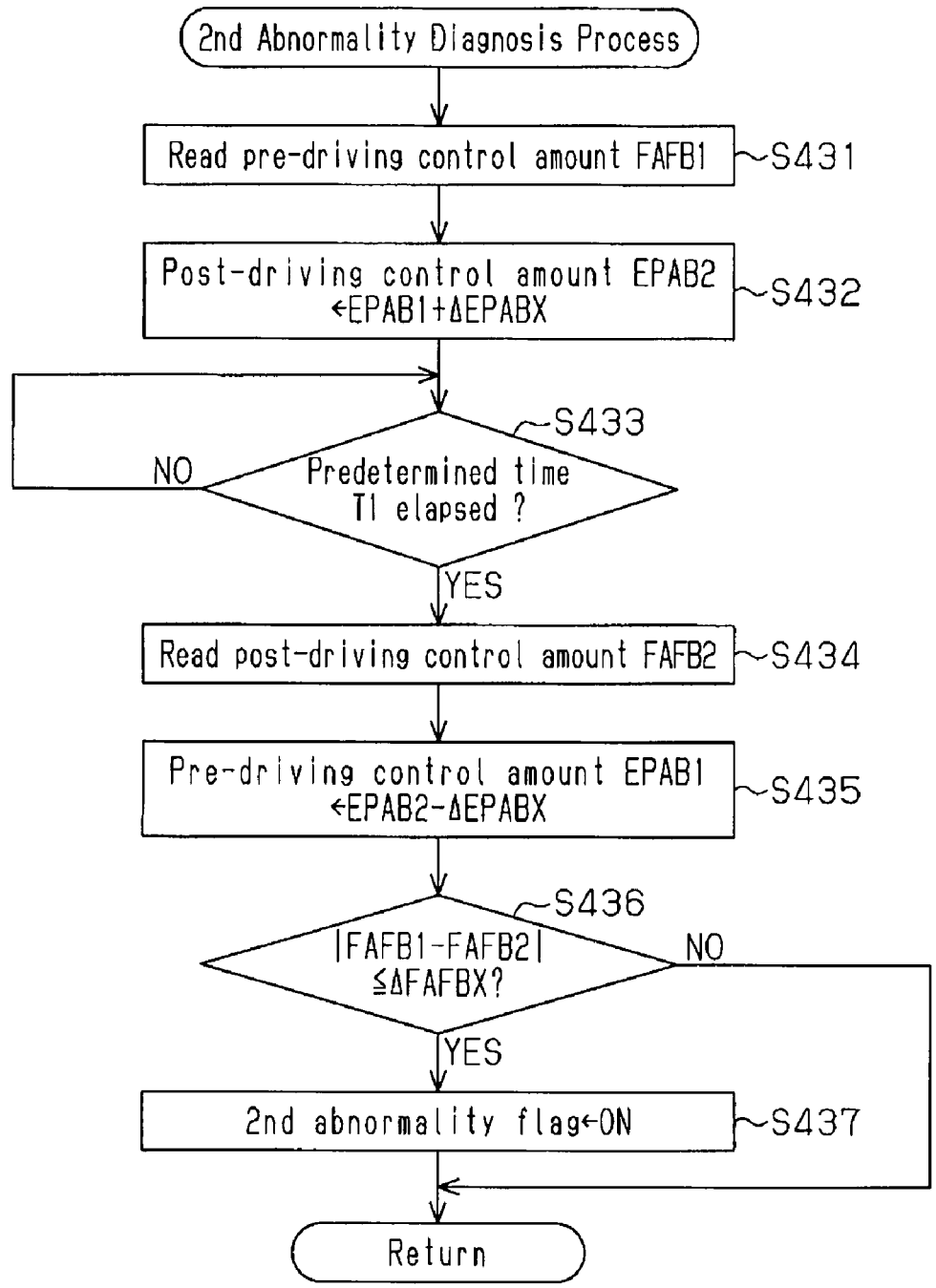
FIG. 8 is a flowchart showing the procedures for executing second abnormality diagnosis in the preferred embodiment.

Next, the specific procedures for performing the second abnormality diagnosing process will now be discussed with reference to the flowchart FIG. 8. The series of processes shown in FIG. 8 is executed when the processing advances to step S430 in the flowchart of FIG. 6.

In the series of processes, the present feedback control amount FAF for the air-fuel ratio control, that is, the feedback control amount FAF (hereinafter referred to as the "pre-driving control amount FAFB1"), which is taken immediately before the control amount EPA of the PCV valve 36 is forcibly varied in subsequent step S432, is first read (step S431).

Next, the control amount EPA of the PCV valve 36 is forcibly increased by a predetermined amount ΔEPABX (pre-determined amount Cb) from the present control amount (hereinafter referred to as the "pre-driving control amount EPAB1"). Specifically, the control amount EPA of the PCV valve 36 is increased from the control amount EPAB1 to a control amount (hereinafter referred to as the "post-driving control amount EPAB2"), which is obtained by adding the predetermined amount ΔEPABX to the control amount EPAB1 (step S432). The predetermined amount ΔEPABX, which is the varied amount of the control amount EPA, is set to a value that is less than the predetermined amount ΔEPAAX of step S412 in FIG. 7 (ΔEPABX<ΔEPAAX).

In a state in which the positive crankcase ventilation apparatus 30 is normal, when the control amount EPA is varied from the pre-driving control amount EPAB1 to the post-driving control amount EPAB2, the open degree of the PCV valve 36 is varied from a pre-driving open degree PAB1, which corresponds to the pre-driving control amount EPAB1, to a post-driving open degree PAB2, which corresponds to the post-driving control amount EPAB2 (PAB2>PAB1). As a result, the re-circulated fuel amount QP supplied to the intake passage 22 through the PCV passage 34 is increased in correspondence with the difference between the pre-driving open degree PAB1 and the post-driving open degree PAB2.

This increases the total fuel amount QSUM, which in turn increases the engine speed NE.

When an abnormality such as jamming the PCV valve 36 occurs, the actual open degree of the PCV valve 36 does not vary from the pre-driving open degree PAB1 to the post-driving open degree PAB2 even if the control amount EPA of the PCV valve 36 is varied as described above. Therefore, the re-circulated fuel amount QP supplied to the intake passage 22 is not increased by the amount corresponding to the difference between the pre-driving open degree PAB1 and the post-driving open degree PAB2.

When an abnormality such as clogging of the PCV passage 34 occurs in the PCV passage 34 when the PCV valve 36 is functioning normally, the actual open degree of the PCV valve 36 is varied from the pre-driving open degree PAB1 to the post-driving open degree PAB2 when varying the control amount EPA of the PCV valve 36 as described above. However, the varied amount of the re-circulated fuel amount QP supplied to the intake passage 22 does not correspond to the difference between the pre-driving open degree PAB1 and the post-driving open degree PAB2.

Next, it is determined whether or not the predetermined time T1 has elapsed from when the control amount EPA was forcibly changed in step S432 (step S433). The purpose for performing the process of step S433 is similar to the purpose for performing the process of step S413 in the first abnormality diagnosing process (FIG. 7).

When it is determined the predetermined time T1 has not elapsed in the determination process of step S433, the same determination process is repeatedly executed in fixed intervals until it is determined that the predetermined time T1 has elapsed. When it is determined that the predetermined time T1 has elapsed, the feedback control amount FAF after the forcible varying of the control amount EPA for the PCV valve 36 (hereinafter referred to as the "post-driving control amount FAFB2) is read (step S434).

Next, the control amount EPA of the PCV valve 36 is varied from the present control amount EPA to the control amount prior to the forcible varying performed in step S432. Specifically, the control amount EPA is varied from the post-driving control amount EPAB2 to the pre-driving control amount EPAB1 (step S435).

Next, it is determined whether or not the absolute value of the difference between the pre-driving control amount FAFB1 in the processing of step S431 and the post-driving control amount FAFB2 in the processing of step S431 is less than or equal to the reference value ΔIFAFBX. That is, it is determined whether or not these feedback control amounts have a difference corresponding to the difference between the re-circulated fuel amount QPB1 for the pre-driving open degree PAB1 of the PCV valve 36 and the re-circulated fuel amount QPB2 for the post-driving open degree PAB2 (step S436). The reference value ΔIFAFBX is set to a value between "0" and a reference control amount difference, which is the absolute value between the pre-driving control amount FAFB1 and the post-driving control amount FAFB2 under the condition that there is no abnormality in the positive crankcase ventilation apparatus 30.

When the absolute value of the difference is greater than the reference value ΔFAFBX, it is determined that there is no abnormality in the PCV valve 36 and the PCV passage 34 of the positive crankcase ventilation apparatus 30. Thus, the present processing is temporarily terminated. When it is determined that the absolute value of the difference is less than or equal to the reference value ΔFAFBX, the second abnormality flag is turned "ON" in the process of subsequent step S437. Then, the present processing is temporarily terminated.

Figure 9:
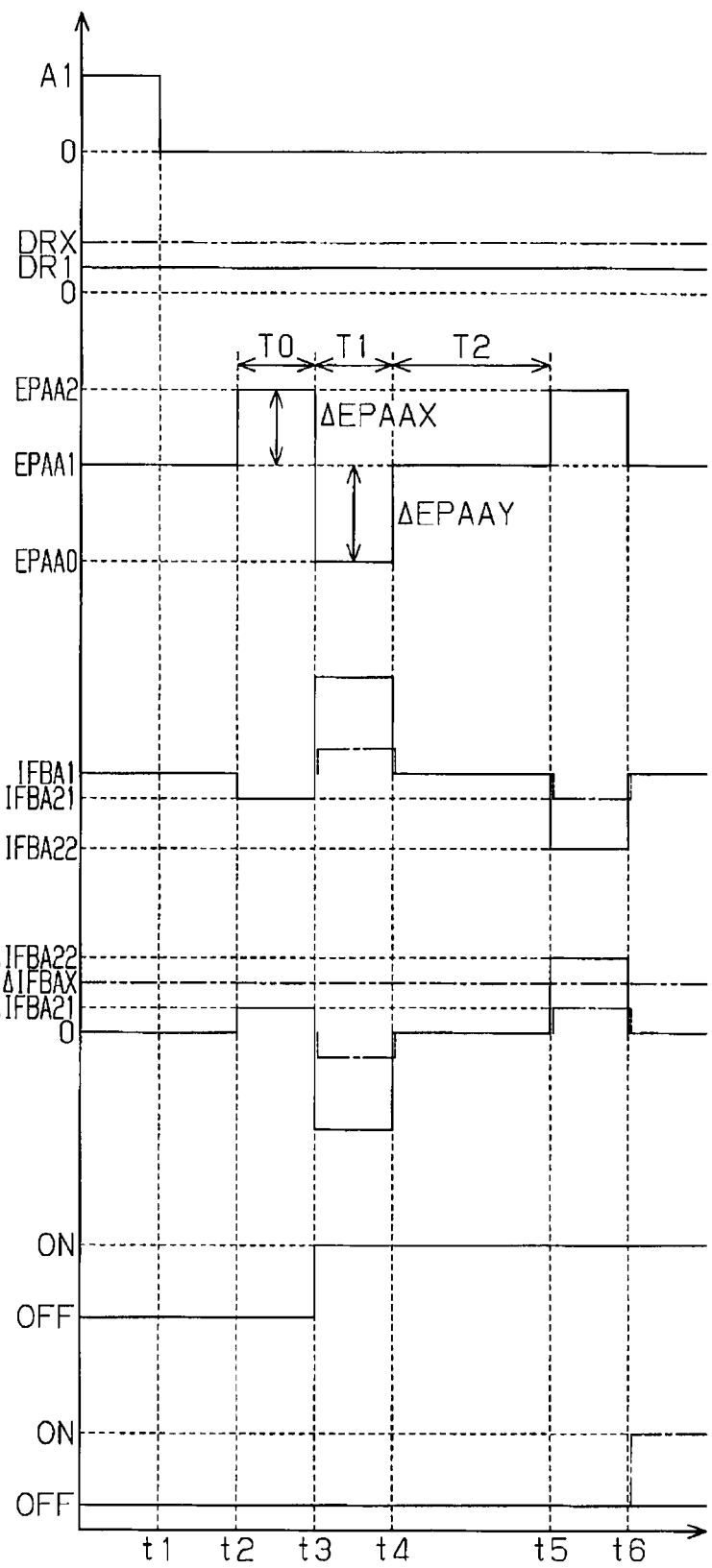
FIG. 9 is a timing chart of the first abnormality diagnosis shown in FIG. 7.

Next, an example of execution of the first abnormality diagnosing process will be described with reference to the timing chart of FIG. 9, which illustrates (a) transition of the accelerator depression amount ACCP, (b) transition of the fuel dilution rate DR, (c) transition of the control amount EPA of the PCV valve 36, (d) transition of the feedback control amount IFB in the IS control, (e) transition of the difference between the feedback control amounts IFB before and after the forcible varying, (f) transition of the first abnormality flag, and (g) transition of the second abnormality flag. In this example, it is assumed that the PCV valve 36 is jammed due to foreign matter caught in the valve driving portion or due to the solidification of moisture, and thus the actual open degree cannot be varied to the target open degree.

At time t1, the accelerator depression amount ACCP (item (a)) is varied from a predetermined value A1 to "0" and the engine 10 thereby becomes idle. At time t2, which is when the predetermined time T0 elapses from time t1, the abnormality diagnosing process is selected based on the fuel dilution rate DR (item (b)). At this time, the fuel dilution rate ((b)) is less than the reference value DRX. Thus, the first abnormality diagnosing process is selected. The control amount EPA of the PCV valve 36 (item (c)) is forcibly increased, and the control amount EPA of the PCV valve 36 is maintained at the post-driving control amount EPAA2, which is greater than the pre-driving control amount EPAA1 by the predetermined amount ΔEPAAX, between time t2 and time t3, the period of which corresponds to the predetermined time T0. In response to the varied control amount EPA, the actuator of the PCV valve 36 attempts to vary the actual open degree from the pre-driving open degree PAA1, which corresponds to the control amount EPAA1, to the post-driving open degree PAA2, which corresponds to the control amount EPAA2. However, since the PCV valve 36 is jammed as described above, the actual open degree does not vary to the open degree PAA2. As a result, the blow-by gas amount GP is increased by an amount that is smaller than an amount corresponding to the difference between the open degree PAA1 and the open degree PAA2 of the PCV valve 36. In order to decrease the air amount GT supplied to the cylinder through the throttle valve 26 in correspondence with the increased amount of the blow-by gas amount GP, the feedback control amount IFB for the IS control (item (d)) is varied from the pre-driving control amount IFBA1 to a post-driving control amount IFBA21, which is less than the control amount IFBA1, during the period between time t2 and time t3. The difference ΔIFBA21 between the feedback control amounts IFB before and after the forcible varying (item (e)) is less than or equal to the reference value ΔIFBAX.

At time t3, the first abnormality flag is turned "ON" since there is an abnormality in the positive crankcase ventilation apparatus 30. Further, at this time, the control amount EPA of the PCV valve 36 (item (c)) is forcibly decreased, and the control amount EPA of the PCV valve 36 is maintained at the post-driving control amount EPAA0, which is smaller than the pre-driving control amount EPAA1 by the predetermined amount ΔEPAAY, during the period between time t3 and time t4. When foreign matters and moisture causing the valve jamming are eliminated by the driving force of the actuator of the PCV valve 36 as a result of the forcible varying, the PCV valve 36 is maintained at the post-driving open degree PAA0, that is, the fully closed state.

At time t5, the predetermined time T2 has elapsed from time t4. In the same manner as during the period between time t2 and time t3, in the period between time t5 and time t6, the control amount EPA of the PCV valve 36 (item (c)) is maintained at a post-driving control amount EPPA2. However, since the PCV valve 36 has returned to a normal state, the actual open degree is varied from the pre-driving open degree PAA1 to the post-driving open degree PAA2 when forcibly varying the control amount EPA of the PCV valve 36. As a result, the blow-by gas amount GP is increased in correspondence with the difference between the open degree PAA1 and the open degree PAA2 of the PCV valve 36. In order to decrease the air amount GT supplied to the cylinder through the throttle valve 26 in correspondence with the increased amount of the blow-by gas amount GP, the feedback control amount IFB (item (d)) is varied from the pre-driving control amount IFBA1 to a post-driving control amount IFBA22, which is smaller than the control amount IFBA1, during the period between time t5 and time t6. At this time, since a difference $\Delta$IFBA22 of the feedback control amount IFB before and after the forcible varying (item (e)) is greater than the reference value $\Delta$IFBAX, the positive crankcase ventilation apparatus 30 is determined to have returned to a normal state, and the second abnormality flag (item (g)) is maintained at "OFF" from time t6.

When foreign matter or moisture causing the valve jamming cannot be eliminated even if the control amount EPA of the PCV valve 36 is forcibly varied during the period between time t3 and time t4, the difference $\Delta$IFBA21 between the feedback control amounts IFB before and after the forcible varying (item (e)) is less than or equal to the reference value $\Delta$IFBAX as shown by the single-dash line. Thus, it is determined that an abnormality is occurring in the positive crankcase ventilation apparatus 30, and the second abnormality flag (item (g)) is varied from "OFF" to "ON" at time t6 as shown by the single-dash line. When the second abnormality flag is turned "ON", a warning may be issued to the driver, for example, by illuminating a warning lamp arranged on an instrument panel of a vehicle.

Figure 10:
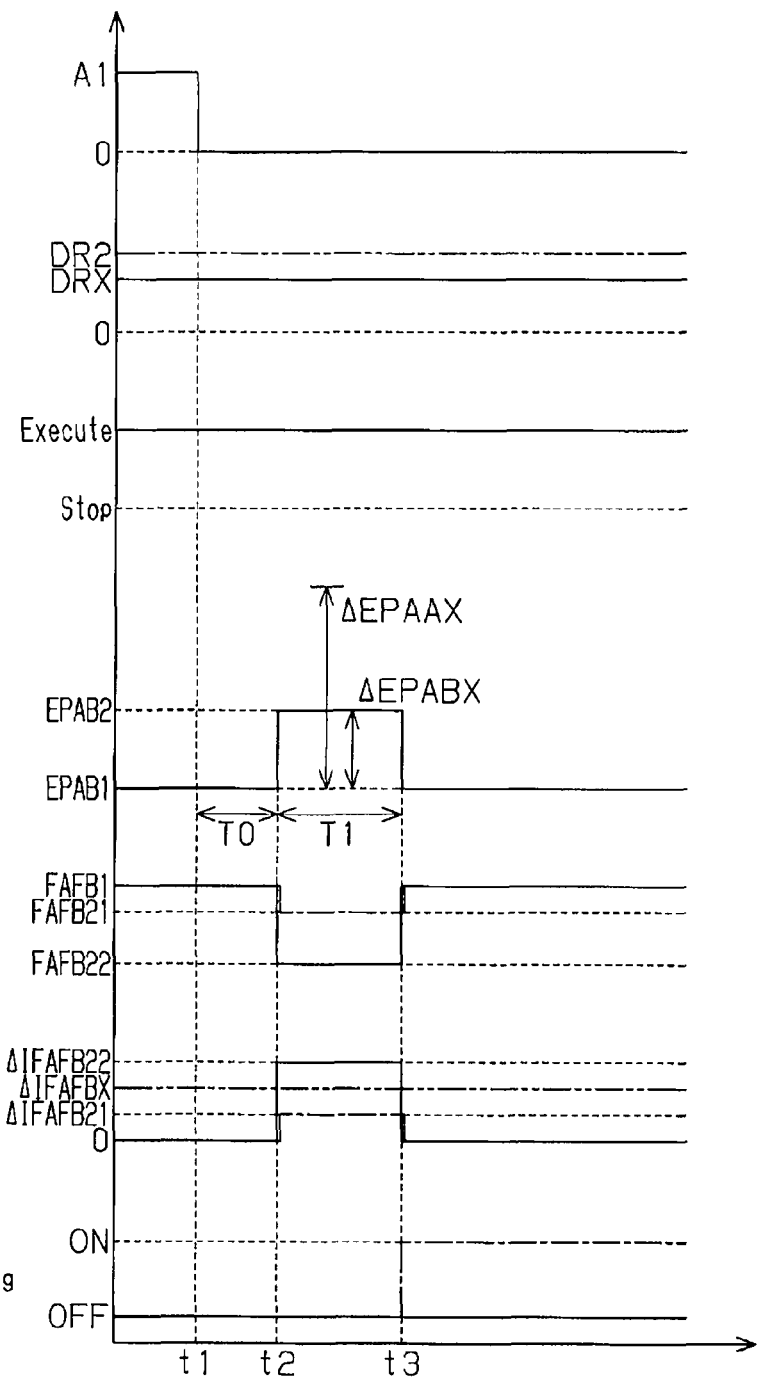
FIG. 10 is a timing chart of the second abnormality diagnosis shown in FIG. 8.

Next, an example of execution of the second abnormality diagnosing process will be described with reference to the timing chart of FIG. 10, which illustrates (a) transition of the accelerator depression amount ACCP, (b) transition of the fuel dilution rate DR, (c) transition of the execution conditions of the air-fuel ratio control, (d) transition of the control amount EPA of the PCV valve 36, (e) transition of the feedback control amount FAFB in the air-fuel ratio control, (f) transition of the difference $\Delta$FAFB between the feedback control amounts FAFB before and after the forcible varying, and (g) transition of the second abnormality flag. In FIG. 10, solid lines indicate a state in which there is no abnormality in the positive crankcase ventilation apparatus 30, and single-dash lines indicate a state in an abnormality is occurring in the positive crankcase ventilation apparatus 30.

At time t1, the accelerator depression amount ACCP (item (a)) is varied from a predetermined value A1 to "0" and the engine 10 thereby becomes idle. At time t2, which is when the predetermined time T0 elapses from time t1, the abnormality diagnosing process is selected based on the fuel dilution rate DR (item (b)). At this time, the fuel dilution rate DR (item (b)) is greater than or equal to the reference value DRX and the air-fuel ratio control is executed (item (c)). Thus, the second abnormality diagnosing process is selected. In this case, the control amount EPA of the PCV valve 36 (item (d)) is forcibly increased. Further, the control amount EPA of the PCV valve 36 is maintained at the post-driving control amount EPAB2, which is greater than the pre-driving control amount EPAB1 by the predetermined amount $\Delta$EPABX, between time t2 and time t3, the period of which corresponds to the predetermined time T1. In response to the varied control amount, the actuator of the PCV valve 36 varies the actual open degree from the pre-driving open degree PAB1, which corresponds to the pre-driving control amount EPAB1, to the post-driving open degree PAB2, which corresponds to the post-driving control amount EPAB2. The predetermined amount $\Delta$EPABX is set to be smaller than the predetermined amount $\Delta$EPAAX shown in item (c) of FIG. 9 ($\Delta$EPABX<$\Delta$EPAAX). As a result, the re-circulated fuel amount QP is increased in correspondence with the difference between the open degree PAB1 and the open degree PAB2 of the PCV valve 36. In order to decrease the fuel injection amount QI, which is injected from the injector 14, by the increased amount of the re-circulated fuel amount QP, the feedback control amount FAFB (item (e)) is varied from the pre-driving control amount FAFB1 to a post-driving control amount FAFB22, which is smaller than the control amount FAFB1, between time t2 and time t3. At this time, since the difference $\Delta$FAFB22 between the feedback control amounts FAFB before and after the forcible varying (item (f)) is greater than the reference value $\Delta$FAFBX, it is determined that there is no abnormality in the positive crankcase ventilation apparatus 30. Thus, the second abnormality flag (item (g)) continues to be "OFF" at time t3 and remains "OFF" afterwards.

When there is an abnormality in which PCV valve 36 is functioning normally but the PCV passage 34 is clogged, at time t2, the control amount EPA of the PCV valve 36 (item (c)) is forcibly increased, and the actual open degree of the PCV valve 36 is varied from the pre-driving open degree PAB1, which corresponds to the pre-driving control amount EPAB1, to the post-driving open degree PAB2, which corresponds to the post-driving control amount APAB2. However, since the PCV passage 34 is clogged, the re-circulated fuel amount QP is increased in correspondence with an amount that is smaller than the difference between the open degree PAB1 and the open degree PAB2 of the PCV valve 36. In order to decrease the fuel injection amount QI, which is injected from the injector 14, by the increased amount of the re-circulated fuel amount QP, the feedback control amount FAFB (item (e)) is varied from the pre-driving control amount FAFB1 to a post-driving control amount FAFB21, which is smaller than the control amount FAFB1, during the period between time t2 and time t3. Since a difference $\Delta$IFAFB21 between the feedback control amounts FAFB before and after the forcible varying (item (f)) is less than or equal to the reference value $\Delta$IFAFBX, it is determined that an abnormality has occurred in the positive crankcase ventilation apparatus 30. Thus, the second abnormality flag (item (g)) is varied from "OFF" to "ON" at time t3.

In the preferred embodiment, the abnormality diagnosis device for a positive crankcase ventilation apparatus has the advantages described below.

(1) When the fuel dilution rate DR is less than the reference value DRX, that is, when the re-circulated fuel amount is assumed to be less than the reference amount, the first abnormality diagnosing process is performed. When the fuel dilution rate DR is greater than or equal to the reference value DRX, that is, when the re-circulated fuel amount is assumed to be greater than or equal to the reference amount, the second abnormality diagnosing process is performed. Therefore, the air fuel ratio is prevented from being excessively enriched when controlling the PCV valve 36 to perform the abnormality diagnosis. At the same time, the occurrence of an abnormality in the positive crankcase ventilation apparatus 30 is accurately determined.

(2) The control amount EPA of the PCV valve 36 is forcibly varied from the control amount EPAA1 to the control amount EPAA2 in the first abnormality diagnosing process. Then, the occurrence of an abnormality in the positive crankcase ventilation apparatus 30 is determined based on the fact that the absolute value of the difference between the feedback control amount IFBA1 for when the control amount EPA of the PCV valve 36 is the control amount EPAA1 and the feedback control amount IFBA2 for when the control amount EPA of the PCV valve 36 is the control amount EPAA2 is less than or equal to the reference value ΔIFBAX. This enables further accurate determination of the occurrence of an abnormality in the positive crankcase ventilation apparatus 30 during the first abnormality diagnosing process.

(3) The control amount EPA of the PCV valve 36 is forcibly varied from the control amount EPAB1 to the control amount EPAB2 in the second abnormality diagnosing process. Then, the occurrence of an abnormality in the positive crankcase ventilation apparatus 30 is determined based on the fact that the absolute value of the difference between the feedback control amount FAFB1 for when the control amount EPA of the PCV valve 36 is the control amount EPAB1 and the feedback control amount FAFB2 for when the control amount EPA of the PCV valve 36 is the control amount EPAB2 is less than or equal to the reference value ΔIFAFBX. Therefore, the second abnormality diagnosing process also enables accurate determination of the occurrence of an abnormality in the positive crankcase ventilation apparatus 30 even though the varying amount of the control amount EPA for the PCV valve 36 is smaller than that of the first abnormality diagnosis.

(4) The abnormality diagnosis is performed when the PCV valve 36 is maintained at a constant control amount. Therefore, when the control amount EPA of the PCV valve 36 is forcibly varied in a state in which there is no abnormality in the positive crankcase ventilation apparatus 30, the varying of the present feedback control amount FAFB in the air-fuel ratio control further accurately reflects the varying of the blow-by gas amount (re-circulated fuel amount QP) when forcibly varying the control amount EPA. This enables further accurate determination of the occurrence of an abnormality in the positive crankcase ventilation apparatus 30.

(5) The abnormality diagnosis is performed when the air amount GSUM drawn into a cylinder remains constant. As a result, when the control amount EPA of the PCV valve 36 is forcibly varied in a state in which there is no abnormality in the positive crankcase ventilation apparatus 30, the varying of the present feedback control amount IFBA in the IS control further accurately reflects the varying of the blow-by gas amount GP when forcibly varying the control amount EPA. This enables further accurate determination of the occurrence of an abnormality in the positive crankcase ventilation apparatus 30.

(6) The relation between the re-circulated fuel amount and the reference amount is estimated based on the relation between the fuel dilution rate DR and the reference value DRX. Accordingly, the occurrence of an abnormality in the positive crankcase ventilation apparatus 30 is determined without any additional component for directly detecting the re-circulated fuel amount QP.

OTHER EMBODIMENTS

It should be apparent to those skilled in the art that the present invention may be embodied in many other specific forms without departing from the spirit or scope of the invention. Particularly, it should be understood that the present invention may be embodied in the following forms.

In the preferred embodiment, during the first and second abnormality diagnosing processes, the control amount EPA of the PCV valve 36 is forcibly increased for the abnormality diagnosis. Instead, the control amount EPA of the PCV valve 36 may be forcibly decreased.

In the preferred embodiment, in the first abnormality diagnosing process, the control amount EPA of the PCV valve 36 is forcibly decreased in order to resolve valve jamming. Instead, the control amount EPA may be forcibly increased.

In the preferred embodiment, the reference values ΔIFBAX and ΔIFABAX are set between "0" and the reference control amount difference. However, the reference values ΔIFBAX and ΔIFABAX do not have to be set in this manner. For example, the reference values ΔIFBAX and ΔIFABAX may be set to "0". In such a case, the occurrence of an abnormality in the positive crankcase ventilation apparatus 30 is determined when the feedback control amounts IFBA and FAFB before and after the forcible varying in the control amount EPA of the PCV valve 36 are the same. Specifically, a determination result indicating the occurrence of an abnormality in the positive crankcase ventilation apparatus 30 is obtained only when the level of the abnormality is most severe in the positive crankcase ventilation apparatus 30. Further, the reference values ΔIFBAX and ΔIFABAX may be set to a value taken immediately before the control amount difference. In such a case, the occurrence of an abnormality in the positive crankcase ventilation apparatus 30 is determined when the absolute value of the difference between the feedback control amounts IFBA and FAFB before and after the forcible change in the control amount EPA of the PCV valve 36 is slightly smaller than the control amount difference. Specifically, a determination result indicating the occurrence of an abnormality in the positive crankcase ventilation apparatus 30 is obtained when the level of the abnormality is least severe in the positive crankcase ventilation apparatus 30.

When the reference values ΔIFBAX and ΔIFABAX are varied as described above, the detected abnormality level of the positive crankcase ventilation apparatus 30 varies. Therefore, the reference values ΔIFBAX and ΔIFABAX may be set in a variable manner in accordance with the abnormality level that is required to be recognized during the abnormality diagnosis. The required abnormality level in this case can be set in accordance with, for example, engine operating conditions and results of past abnormality diagnosis (number of determined abnormality occurrences or frequency of abnormality diagnosis).

In the preferred embodiment, in the first abnormality processing, the control amount EPA of the PCV valve 36 is forcibly varied based on a determination indicating the occurrence of an abnormality so that jamming of the PCV valve 36 is more often resolved when the engine is operating. However, the abnormality diagnosing process can be terminated without performing the control for resolving valve jamming.

In the abnormality diagnosing process of the preferred embodiment (FIG. 6), when the occurrence of an abnormality in the positive crankcase ventilation apparatus 30 is determined through at least either one the first abnormality diagnosing process and the second abnormality diagnosing process, the abnormality diagnosing process does not have to be subsequently executed after the determination until the engine 10 stops operating.

In the preferred embodiment, to execute the first abnormality diagnosing process, the engine is required to be idling (the IS control is being executed). However, the condition for executing the first abnormality diagnosing process is not limited in such a manner, and the first abnormality diagnosing process may be performed under any suitable engine driving conditions as long as a constant in-cylinder air amount is maintained.

In the preferred embodiment, the throttle valve 26 serves as an intake air flow regulation unit provided in the intake passage 22 to regulate the intake air flow rate. However, the intake air flow regulation unit is not limited to the throttle valve 26. For example, in an engine having an IS control passage that bypasses a throttle vale in an intake passage and an IS control valve for regulating the amount of air flowing through the IS control passage, the IS control valve may serve as the intake air flow regulation unit. Therefore, the abnormality determination may be performed based on the feedback control amount of the IS control valve in the IS control.

In the preferred embodiment, the air-fuel ratio sensor 56 serves as a detection unit for acquiring the oxygen concentration of exhaust gas. However, the detection unit is not limited to the air-fuel ratio sensor 56, and an oxygen sensor may be used in lieu of the air-fuel ratio sensor 56.

In the preferred embodiment, during the first abnormality diagnosing process, reflection of the forcible varying of the control amount EPA for the PCV valve 36 on the actual open degree is checked using the feedback control amount IFBA in the IS control that is varied by the influence of blow-by gas. Instead of the feedback control amount IFBA, the intake amount in the intake passage, which is varied by the influence of blow-by gas, may be used.

In the preferred embodiment, during the second abnormality diagnosing process, reflection of the forcible varying of the control amount EPA for the PCV valve 36 on the actual open degree is checked using the feedback control amount FAFB in the air-fuel ratio control that is varied by the influence of re-circulated fuel in blow-by gas. Instead of the feedback control amount FAFB, the oxygen concentration of exhaust gas, which is varied by the influence of the re-circulated fuel in blow-by gas, may be used.

It is only required that the varying amount of the control amount of the PCV valve in the first abnormality diagnosing process be greater than the varying amount of the control amount of the PCV valve in the second abnormality diagnosing process. The specific contents of the first abnormality diagnosing process is not limited to the contents of the preferred embodiment and may be changed as required as long as the amount of the re-circulated fuel supplied to the intake passage varies when forcibly varying the open degree of the PCV valve and the abnormality diagnosis is performed based on how this affects a parameter. Further, it is only required that the varying amount of the control amount of the PCV valve in the second abnormality diagnosing process be less than the varying amount of the control amount of the PCV valve in the first abnormality diagnosing process. The specific contents of the second abnormality diagnosing process is not limited to the contents of the preferred embodiment and may be changed as required as long as the amount of the re-circulated fuel supplied to the intake passage varies when forcibly varying the open degree of the PCV valve and the abnormality diagnosis is performed based on how this affects a parameter.

The present examples and embodiments are to be considered as illustrative and not restrictive, and the invention is not to be limited to the details given herein, but may be modified within the scope and equivalence of the appended claims.

What is claimed is:

1. An abnormality diagnosis device for diagnosing abnormality in a positive crankcase ventilation apparatus, in which the positive crankcase ventilation apparatus includes a positive crankcase ventilation passage, which is for supplying blow-by gas to an intake passage of an internal combustion engine, and a positive crankcase ventilation valve, which is for regulating the flow rate of blow-by gas in the positive crankcase ventilation passage, the abnormality diagnosis device comprising:
a determination unit that varies a control amount of the positive crankcase ventilation valve to determine the occurrence of an abnormality in at least either one of the positive crankcase ventilation passage and the positive crankcase ventilation valve, wherein the determination unit performs an abnormality diagnosis in a first determination mode when a re-circulated fuel amount, which is the amount of fuel components in the blow-by gas, is less than a reference amount and in a second determination mode when the re-circulated fuel amount is greater than the reference amount, wherein the determination unit sets a varying amount of the control amount of the positive crankcase ventilation valve in the second determination mode to be smaller than that of the control amount of the positive crankcase ventilation valve in the first determination mode.

2. The abnormality diagnosis device according to claim 1, wherein:
the determination unit in the first determination mode forcibly varies the control amount of the positive crankcase ventilation valve from a control amount A1 to a control amount A2, compares a predetermined parameter A when the control amount of the positive crankcase ventilation valve is the control amount A1 with the predetermined parameter A when the control amount of the positive crankcase ventilation valve is the control amount A2, and determines based on the comparison whether or not an abnormality is occurring in the positive crankcase ventilation apparatus; and
the determination unit in the second determination mode forcibly varies the control amount of the positive crankcase ventilation valve from a control amount B1 to a control amount B2, compares a predetermined parameter B when the control amount of the positive crankcase ventilation valve is the control amount B1 with the predetermined parameter B when the control amount of the positive crankcase ventilation valve is the control amount B2, and determines based on the comparison whether or not an abnormality is occurring in the positive crankcase ventilation apparatus.

3. The abnormality diagnosis device according to claim 2, wherein when determining that the re-circulated fuel amount is less than the reference amount before performing the abnormality diagnosis, the determination unit sets the present control amount of the positive crankcase ventilation valve as the control amount A1 and sets a control amount that is greater than the control amount A1 by a predetermined amount as the control amount A2 to forcibly vary the control amount of the positive crankcase ventilation valve from the control amount A1 to the control amount A2 and thereafter performs the abnormality diagnosis.

4. The abnormality diagnosis device according to claim 2, wherein when determining that the re-circulated fuel amount is greater than the reference amount before performing the abnormality diagnosis, the determination unit sets the present control amount of the positive crankcase ventilation valve as the control amount B1 and sets a control amount that is greater than the control amount B1 by a predetermined amount as the control amount B2 to forcibly vary the control amount of the positive crankcase ventilation valve from the control amount B1 to the control amount B2 and thereafter performs the abnormality diagnosis.

5. The abnormality diagnosis device according to claim 2, wherein;

when determining that the re-circulated fuel amount is less than the reference amount before performing the abnormality diagnosis, the determination unit sets the present control amount of the positive crankcase ventilation valve as the control amount A1 and sets a control amount that is greater than the control amount A1 by a predetermined amount Ca as the control amount A2 to forcibly vary the control amount of the positive crankcase ventilation valve from the control amount A1 to the control amount A2 and thereafter performs the abnormality diagnosis;

when determining that the re-circulated fuel amount is greater than the reference amount before performing the abnormality diagnosis, the determination unit sets the present control amount of the positive crankcase ventilation valve as the control amount B1 and sets a control amount that is greater than the control amount B1 by a predetermined amount Cb as the control amount B2 to forcibly vary the control amount of the positive crankcase ventilation valve from the control amount B1 to the control amount B2 and thereafter performs the abnormality diagnosis; and the predetermined amount Cb is less than the predetermined amount Ca.

6. The abnormality diagnosis device according to claim 2, wherein:

the intake passage includes an intake air flow regulation unit for regulating the amount of intake air; and the determination unit uses a control amount of the intake air flow regulation unit as the predetermined parameter A that is referred to in the first determination mode.

7. The abnormality diagnosis device according to claim 6, wherein the determination unit determines in the first determination mode the occurrence of an abnormality in the positive crankcase ventilation apparatus when the difference between the control amount of the intake air flow regulation unit in a state in which the control amount of the positive crankcase ventilation valve is the control amount A1 and the control amount of the intake air flow regulation unit in a state in which the control amount of the positive crankcase ventilation valve is the control amount A2 is equal to or less than a reference value AX.

8. The abnormality diagnosis device according to claim 7, wherein:

under a condition in which the positive crankcase ventilation apparatus is free from an abnormality, a reference difference AY is set by the absolute value of the difference between the control amount of the intake air flow regulation unit in a state in which the control amount of the positive crankcase ventilation valve is the control amount A1 and the control amount of the intake air flow regulation unit in a state in which the control amount of the positive crankcase ventilation valve is the control amount A2; and the reference value AX is set as a value that is greater than zero and less than the reference difference AY.

9. The abnormality diagnosis device according to claim 2, wherein:

the internal combustion engine includes a fuel injection regulation unit which regulates the amount of injected fuel based on the concentration of oxygen in exhaust gas; and the determination unit uses a control amount of the fuel injection regulation unit as the predetermined parameter B that is referred to in the second determination mode.

10. The abnormality diagnosis device according to claim 9, wherein the determination unit determines in the second determination mode the occurrence of an abnormality in the positive crankcase ventilation apparatus when the difference between the control amount of the fuel injection regulation unit in a state in which the control amount of the positive crankcase ventilation valve is the control amount B1 and the control amount of the fuel injection regulation unit in a state in which the control amount of the positive crankcase ventilation valve is the control amount B2 is equal to or less than a reference value BX.

11. The abnormality diagnosis device according to claim 10, wherein:

under a condition in which the positive crankcase ventilation apparatus is free from an abnormality, a reference difference BY is set by the absolute value of the difference between the control amount of the injection amount regulation unit in a state in which the control amount of the positive crankcase ventilation valve is the control amount B1 and the control amount of the injection amount regulation unit in a state in which the control amount of the positive crankcase ventilation valve is the control amount B2; and the reference value BX is set as a value that is greater than zero and less than the reference difference BY.

12. The abnormality diagnosis device according to claim 1, wherein the determination unit performs the abnormality diagnosis when a condition indicating that the control amount of the positive crankcase ventilation valve is kept constant is satisfied.

13. The abnormality diagnosis device according to claim 1, wherein the determination unit performs the abnormality diagnosis when a condition indicating that the amount of air drawn into a cylinder of the internal combustion engine is kept constant is satisfied.

14. The abnormality diagnosis device according to claim 1, wherein the determination unit performs the abnormality diagnosis when the internal combustion engine is idling.

15. The abnormality diagnosis device according to claim 1, wherein the determination unit estimates the relationship between the re-circulated fuel amount and the reference amount based on the amount of fuel diluted in lubricating oil in a crankcase of the internal combustion engine.

* * * * *